United States Patent [19]

McFall et al.

[11] 4,174,496

[45] Nov. 13, 1979

[54] MONOLITHIC SOLID STATE POWER CONTROLLER

[75] Inventors: William A. McFall, Fullerton; Stanley A. White, Santa Ana; Howard K. Lane, Laguna Niguel; Daryl T. Butcher, La Habra; Donald V. Anderson, Jr., Riverside; Patrick E. McCollum, Santa Ana; James F. Kirk, Anaheim; Richard Plesset, Santa Ana, all of Calif.

[73] Assignee: Rockwell International Corporation, El Segundo, Calif.

[21] Appl. No.: 930,460

[22] Filed: Aug. 2, 1978

[51] Int. Cl.² .............................................. H02H 3/26
[52] U.S. Cl. ........................................ 323/9; 323/24; 361/97
[58] Field of Search ..................... 323/4, 9, 19, 22 SC, 323/24; 361/18, 93, 95–97, 100

[56] References Cited

U.S. PATENT DOCUMENTS

| | | | |
|---|---|---|---|
| 3,504,204 | 3/1970 | Carrive | 307/305 |
| 3,577,177 | 5/1971 | Hewlett | 323/18 |
| 3,879,652 | 4/1975 | Billings | 323/22 SC |
| 3,959,715 | 5/1976 | Canning | 323/24 X |
| 3,989,999 | 11/1976 | Thompson et al. | 323/9 |
| 4,000,446 | 12/1976 | Vandevier et al. | 361/96 X |
| 4,017,766 | 4/1977 | Vercellotti et al. | 361/96 X |
| 4,038,695 | 7/1977 | DePuy | 361/96 |
| 4,063,146 | 12/1977 | Oliver | 323/22 SC |

OTHER PUBLICATIONS

Defreese et al., "New Type of Programmable Current Regulated Supply", Analytical Chemistry, vol. 46, No. 11, Sep. 1974, pp. 1471–1476.

Primary Examiner—A. D. Pellinen
Attorney, Agent, or Firm—L. Lee Humphries; H. Fredrick Hamann; Rolf M. Pitts

[57] ABSTRACT

A monolithic solid state power controller generally comprises a power supply, zero voltage crossing detector, operator interface circuitry, current sensing and trip timing logic (having zero current detection capability), drive circuitry, and a power switch. The current sensing and trip timing logic functions are implemented in a monolithic device which provides flexible mode of operation of the switch, operator command validation, status and mode indication, drive enablement in synchronization with zero voltage crossing of the source voltage, and tripout operation in synchronization with zero current crossing in the load current. Both fast trip (in response to catastrophic overcurrent) and timed trip (in response to overcurrent conditions occurring over a period of time) capabilities are provided.

34 Claims, 16 Drawing Figures

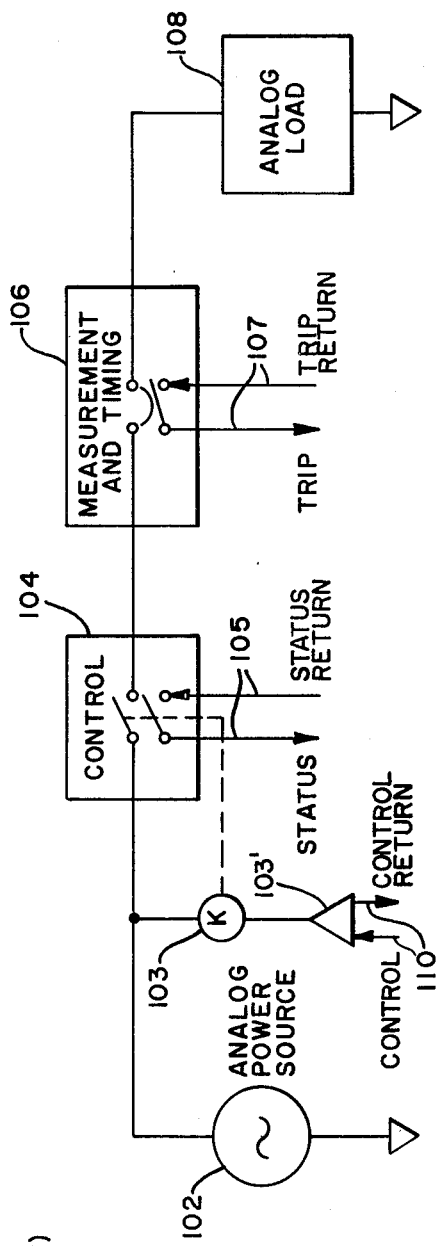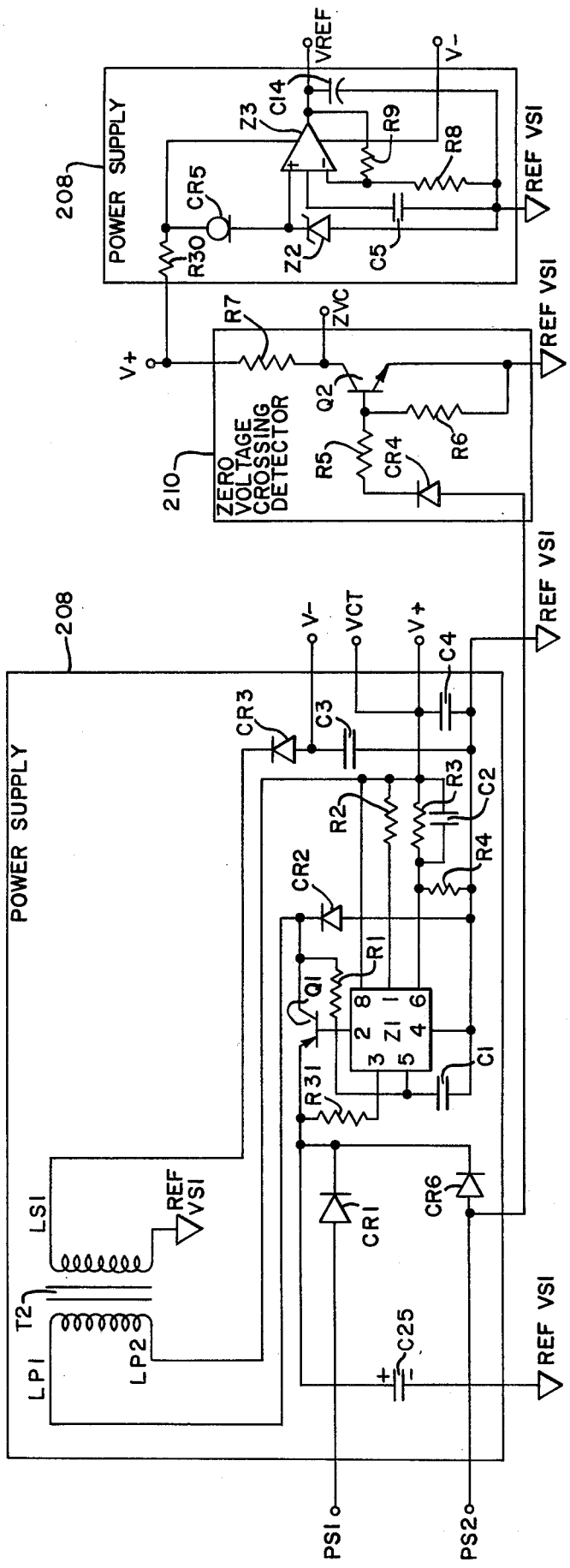
FIG. 1.
(PRIOR ART)
FIG. 3.

MONOLITHIC SOLID STATE POWER CONTROLLER

BACKGROUND OF THE INVENTION

1. Field of the Invention

The present invention relates to a monolithic solid state power controller (SSPC) for use in the switching and distribution of power, and more specifically, for use in providing full-cycle control of power being delivered to an electrical load.

2. Description of the Prior Art

Many diverse types of power control systems have been used in the prior art for controlling the power provided to a load. Such prior art systems have included motor-driven potentiometers, magnetic amplifiers, and other diverse electrical and electro-mechanical elements.

However, such electro-mechanical systems suffer the disadvantages of excessive space requirements, excessive weight, and excessive costs. Moreover, in certain applications—such as in aircraft systems—the necessity of performing very complex functions has necessitated the design of very complex circuitry, with attendant disadvantages related to cost, size, weight, heat dissipation, and inherent unreliability.

In order to overcome the above disadvantages, electromechanical relays and thermal overload devices have been replaced by solid state power controllers which, for example, employ silicon-controlled rectifiers (SCR) to perform power switching and circuit breaking functions. Such solid state power controllers are disclosed in U.S. Pat. Nos. 3,504,204 and 3,879,652. Such power controllers have typically contained zero crossover circuits associated with control logic in order to control the solid state switch in accordance with the zero crossings of an AC source waveform applied to the load. Furthermore, such systems have also typically included complementary SCR devices for controlling respective half-cycles of an AC source voltage.

Such zero-crossing SCR control systems have been adapted for flexibility so as to be usable for both single-phase, full-wave and three-phase operations. Such a system is disclosed in U.S. Pat. No. 3,577,177, as well as in IBM Technical Disclosure Bulletins authored by L. A. Smith (Volume 11, No. 5, October 1968, page 501) and by L. M. Ernst and T. L. Wells (Volume 15, No. 3, August 1972, page 734), and in RCA Application note ICAN-6268 dated June 1970, authored by H. M. Kleinman and A. Sheng.

Power control systems have been designed for various modes of "trip" initiation. That is, actuation of the power controller so as to block the application of power to a load may be multi-mode in that different modes of "trip" operation are actuated in response to various respective conditions in the circuit such as catastrophic overcurrent (necessitating immediate "trip") or moderate overcurrent (necessitating less immediate action ("timed trip")). Such a multi-mode "trip" operation is disclosed in U.S. Pat. No. 4,038,695.

Such prior art multi-mode "trip" operation has been, however, burdened by several disadvantages. Firstly, such systems have not taken advantage of advanced solid state circuitry to include digital mechanization of trip timing and control functions (as, for example, by mechanization via a monolithic integrated circuit (IC) device). Secondly, such systems have not been sufficiently sophisticated or precise in their operation, and thus have not been capable of simultaneously considering, and incorporating into trip time computations, both the transient current value and the time duration of the overcurrent. Thirdly, such systems have not been flexible so as to provide a power controller which is pre-settable for switch operation in either the "normally open" (NO) or "normally closed" (NC) modes of operation. Fourthly, such systems have not had the capability of validating control signals, applied to the system such as "turn on" and "turn off" control signals. Finally, such systems have not been capable of achieving stability in various environments, and thus have not been immunized from noise, temperature, vibration, and a nuclear environment. Such immunity is, of course, particularly necessary when such power controllers are employed in modern aircraft control systems.

SUMMARY OF INVENTION

According to the present invention, there is provided a monolithic solid state power controller providing full-cycle control of power delivered to an electrical load in power system.

Specifically, the monolithic solid state power controller is employed in an AC power system generally comprising an AC power source, transformer, fuse link, power switch, sense resistor, and load.

The monolithic solid state power controller is capable of full-cycle operation, as follows. In response to a "turn on" control signal, the solid state power controller turns on at the zero-voltage point where the AC source voltage input is positive-going. Similarly, in response to a "turn off" control signal, the solid state power controller turns off at the zero-current point where the load current is positive going. Finally, control of the AC power is achieved by provision, within the solid state power controller, of the capability of "trip" initiation (in response to excessive load current, or overcurrent) only at the next available zero-current crossing regardless of whether the load current is positive- or negative-going.

The monolithic solid state power controller itself comprises: a zero voltage crossing detector circuit for detecting zero voltage crossing in the AC voltage to be applied to the load; interface circuitry for receiving an operator control input and providing operation indicator outputs; current sensing and trip timing logic for performing the general functions of load current sensing and trip timing computation, and for generating drive output signals; and drive circuitry responsive to the drive output signals for selectively actuating the power switch in such a manner as to provide full-cycle control (discussed above) of the AC power being delivered to the electrical load.

The invention has a remote current sensing capability for power control by virtue of the provision of a sense resistor connected between the power switch and the load, across which sense resistor a voltage drop occurs as a result of application of AC power thereto. Resulting sense voltages are transmitted to the current sensing and trip timing logic in the solid state power controller. Thus, the solid state power controller can be remotely located with respect to the load.

The inventive solid state power controller takes full advantage of advanced circuit technology. The current sensing and trip timing logic—which performs the functions of zero current detection, analog-to-digital conversion and digital processing of sensed voltages, validation of operator control inputs, trip mode determination, and generation of both drive outputs (for controlling the power switch) and operation indicator outputs—is digitally implemented as a monolithic IC device in complementary metal oxide semiconductor (CMOS)-/silicon-on-sapphire (SOS)/large scale integration (LSI) circuit technology.

Such digital implementation not only achieves the usual advantages with respect to space, weight, cost and maintenance, but also provides full digital implementation of the load current sensing/processing and trip timing functions performed by the current sensing and trip timing logic. Full digital mechanization of the trip time computation function is particularly advantageous in that catastrophic overcurrent conditions can be immediately detected and the appropriate "fast trip" mode of operation commenced. In addition, with respect to the "timed trip" mode of operation, digital implementation increases the precision with which computation of the trip time is accomplished, and such computation is arried out by taking account of both the value of the duration of the load overcurrent.

The inventive monolithic solid state power controller has the capability of selectively operating in either the "normally opened power switch" or "normally closed power switch" modes of operation. As will be seen below, this is accomplished via an NO/NC control input provided to the monolithic device (specifically, to the current sensing and trip timing logic thereof). The absence of any external connection to the NO/NC line results in the "normally open" mode of operation, while the external connection of the NO/NC line to a reference voltage level at the output of the power switch results in operation in accordance with the "normally closed" mode.

The current sensing and trip timing logic (monolithic device) also has the capability of validating command-/control signal inputs. Specifically, each time a command/control input changes, it is tested for both voltage level and duration, duration being tested by timing circuitry contained within the monolithic device. Successful testing of both the voltage level and duration invalidates the command/control signal, thus providing command/control signal noise immunity.

The current sensing and trip timing logic also has the capability, via a "sense both half-cycle" comparator and status logic circuit, of generating a status output in a manner completely independent of the other power control functions. Such status output indicates the status of the load voltage, that is to say, indicates "power on" or "power off" conditions in the load circuit.

The monolithic solid state power controller contains interface circuitry which functions to provide an interface, by which operator control inputs are provided to, and status and trip indicator outputs are provided by, the current sensing and trip timing logic. As will be seen in the detailed description below, the interface circuitry employs a plurality of transformers which provide magnetic isolation in the link between the current sensing and trip timing logic and the control signal inputs, as well as between the current sensing and trip timing logic and the status and trip indicator outputs.

As an alternative implementation, the monolithic solid state power controller is employed in a DC power system—for example, as a power controller in a solar cell energization system. Such a cell includes a DC source (or plurality of such sources) connected to a load for providing DC energy thereto. The DC source (or sources) are connected in series with a solar cell array energized by solar radiation for the purpose of recharging the DC sources. The series circuit formed by the DC sources and the solar cell array also includes a power switch for interrupting the flow of recharging energy from the solar cell array to the DC sources, such interruption being the result of operation of the monolithic solid state power controller disclosed below.

Therefore, it is an object of the present invention to provide a monolithic solid state power controller providing control of power delivered to an electrical load.

It is an additional object of the present invention to provide a monolithic solid state power controller providing full-cycle control of AC power delivered to an electrical load.

It is an additional object of the present invention to provide a monolithic solid state power controller providing control of DC power delivered to an electrical load—for example, for controlling the delivery of DC power by a solar cell arrangement to a DC source or plurality of such sources.

It is an additional object of the present invention to provide a monolithic solid state power controller having a remote current sensing capability for power control.

It is an additional object of the present invention to provide a power controller which takes full advantage of advanced circuit technology including implementation as a monolithic IC device in CMOS/SOS/LSI circuit technology.

It is an additional object of the present invention to provide a solid state power controller which, to the maximum extent, is digitally implemented, especially insofar as the function of trip time computation is concerned.

It is a further object of the present invention to provide a monolithic solid state power controller which has the capability of selectively operating in either the "normally open power switch" or "normally closed power switch" modes of operation.

It is a further object of the present invention to provide a monolithic solid state power controller which has the capability of validating command/control signal inputs thereto.

It is a further object of the present invention to provide a monolithic solid state power controller which has the capability of generating a status output indicating the status of the load voltage in the load circuit, and of preferably generating such status output in a manner completely independent of the other power control functions.

It is a a further object of the present invention to provide a monolithic solid state power controller containing interface circuitry for providing an interface by which operator control inputs are provided to, and status and trip indicator outputs are provided by, the monolithic solid state power controller.

It is a further object of the present invention to provide interface circuitry which provides magnetic isolation in the link between the monolithic solid state power controller and the control signal inputs and status and trip indicator outputs, respectively.

With the above and other objects in view that will hereinafter appear, the nature of the invention will be more clearly understood by reference to the following description, the appended claims, and the accompanying drawings.

BRIEF DESCRIPTION OF THE DRAWINGS

FIG. 1 is a diagrammatic representation of a power controller arrangement of the prior art.

FIG. 3 is a diagrammatic representation of the power supply 208 and zero voltage crossing detector 210.

DETAILED DESCRIPTION

Figure 2:
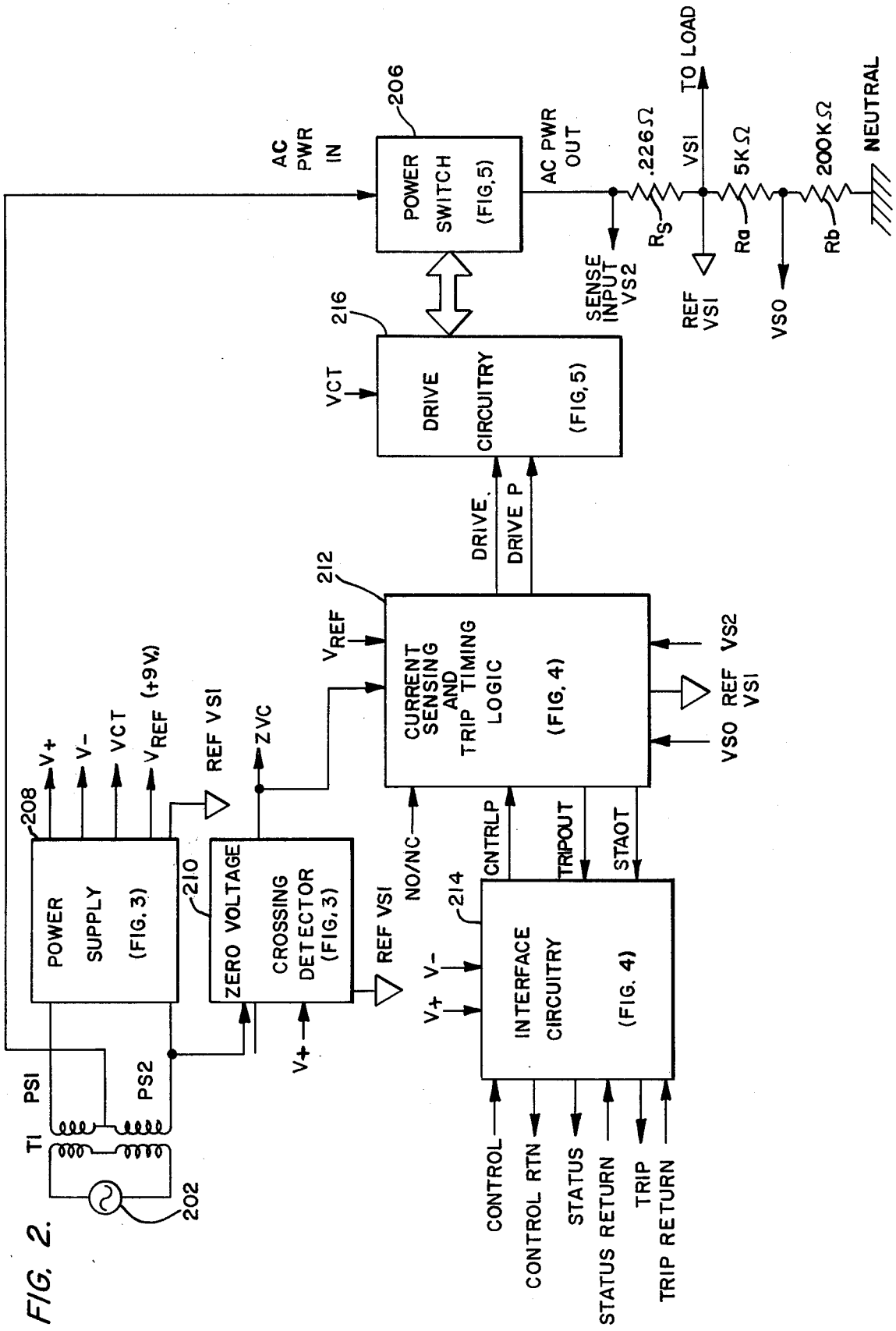
FIG. 2 is a diagrammatic representation of the monolithic solid state power controller of the present invention employed in an AC power system.

The monolithic solid state power controller of the present invention will now be more fully described with reference to the above-described figures of the drawings.

FIG. 1 is a diagrammatic representation of a power controller arrangement of the prior art. Typically, an analog power source 102 is connected, via control circuitry (having internal relay contacts) 104 and measurement and timing circuit (such as a thermal circuit breaker) 106, to an analog load 108.

In operation, a digital command and monitor console (not shown) transmits a command CONTROL over input line 110 so as to cause (via driver 103′ and relay coil 103) actuation of relay contacts in control circuitry 104 to a closed position. Analog power is then permitted to flow from source 102 through the closed relay contacts in control circuitry 104 and the thermal circuit breaker 106 to an analog load 108. When an overcurrent condition is detected by the thermal circuit breaker 106, it actuates to an open position, interrupting the application of power by the source 102 to the load 108. Thus, a "trip" condition is created.

The digital command and monitor console receives (via output line 107) a trip indication signal indicating that a "trip" condition has occurred, and receives (via output line 105) a status signal indicating the voltage status of the circuit, that is, whether or not the relay contacts in control 104 are closed. Thus, a significant disadvantage of the prior art system relates to the fact that the status signal indicates only the "open" or "closed" position of the relay contacts in the control circuit 104, but does not indicate the status of the relay contacts in the measurement and timing circuit 106. In other words, it is more desirable to have a "STATUS" output which indicates whether or not power is being applied to the load through both the relay contacts in control 104 and those in measurement and timing circuit 106. Such disadvantage is, as will be seen below, eliminated by the monolithic solid state power controller of the present invention.

Whereas the prior art power controller of FIG. 1 constitutes an electro-mechanical implementation, analog techniques were subsequently applied to achieve analog mechanization of the power controller function. Such analog mechanization was achieved by the use of analog comparators and capacitors (as precision components), among other elements. However, this analog mechanization resulted in many disadvantages such as lack of precision, inflexibility, inability to validate command/control signals, instability of operation, susceptibly to noise and component drift, and prohibitive cost, size, weight, and power dissipation.

Thus, as previously mentioned, such electro-mechanical power controllers (such as shown in FIG. 1), and analog mechanizations thereof, were soon replaced by solid state power controllers which, for example, employed SCR's to perform power switching and circuit breaker functions. Such solid state power controllers have been previously described above with reference to various U.S. patents and publications.

Solid state power controllers of the prior art have typically implemented the control circuitry 104 of FIG. 1 by means of complementary SCR's, and have implemented the measurement and timing circuitry 106 by means of analog circuitry, digital circuitry, or a combination thereof. In any event, such solid state power controllers of the prior art have not achieved the objective of compactness by combining a solid state relay function (generally corresponding to the electro-mechanical function of control circuitry 104) with a solid state circuit breaker function (generally corresponding to the function of measurement and timing circuitry 106) into a single monolithic device with digital mechanization of the trip timing and control functions to the maximum possible extent.

Conversely, the inventive solid state power controller disclosed herein takes full advantage of advanced circuit technology, is digitally implemented as a single monolithic IC device in CMOS/SOS/LSI circuit technology, and achieves digital implementation—to the fullest extent possible—of the functions of processing sensed voltages, validation of operator control inputs, trip mode determination, generation of operation indicator outputs, and generation of drive outputs for controlling the power switch. As mentioned earlier, such digital implementation not only achieves the usual advantages with respect to space, weight, cost and maintenance, but also provides speed and accuracy in the detection of overcurrent conditions for the "fast trip" mode of operation and computation of trip times for the "timed trip" mode of operation. In addition, the inventive solid state power controller achieves various other advantages (previously described above).

The invention will now be described with reference to FIG. 2, which is a diagrammatic representation of the monolithic solid state power controller of the present invention, as employed in an AC power system for controlling the application of AC power to a load.

The monolithic solid state power controller is employed in an AC power system generally comprising an AC power source 202 connected, via a transformer T1, a power switch 206, a sense resistor $R_s$, to a load (not shown). More specifically, the output AC PWR OUT of power switch 206 corresponds to sense input voltage VS2 (which will be further discussed below). Sense input voltage VS2, when voltage divided via resistors $R_s$, $R_a$ and $R_b$, provides voltages VS1 and VS0, respectively. Voltage VS1 corresponds to the voltage applied to the load, and also corresponds to common reference REF VS1, to which various components of the solid state power controller are connected (as will be discussed below). Voltage VS0, as well as sense input voltage VS2, are utilized in the current sensing and trip timing logic functions performed by the solid state power controller.

The outputs PS1 and PS2 of transformer T1 are connected to a power supply 208 which provides various D.C. voltages—V+, V−, VCT, VREF—for use by various components of the solid state power controller. The power supply 208 is connected to the common reference REF VS1.

The output PS2 of the transformer T1 is provided to the zero voltage crossing detector circuit 210, which also receives the voltage input V+. The zero voltage crossing detector circuit 210 detects the zero voltage crossing in the AC voltage to be applied to the load, and issues an output ZVC corresponding thereto. ZVC is high during the positive half-cycle of the source voltage.

The output ZVC of zero voltage crossing detector circuit 210 is provided, as an input, to the current sensing and trip timing logic 212, which also receives inputs VREF, sense voltage VS0 and sense input voltage VS2. Current sensing and trip timing logic 212 performs the general functions of load current sensing and trip timing computation via input VS2. When, as a result of such load current sensing and trip timing computation functions, the current sensing and trip timing logic 212 determines that a "fast trip" or "timed trip" condition exists, the output TRIPOUT is generated. In addition, the current sensing and trip timing logic 212 generates drive outputs DRIVE and DRIVEP, by which the opening (or closing) of the power switch 206 is accomplished.

Current sensing and trip timing logic 212 receives an operator-provided input NO/NC which, when not externally connected, results in a "normally open" mode of operation of the power switch 206, but which, when externally connected to REF VS1, results in a "normally closed" mode of operation of the switch 206.

The monolithic solid state power controller is provided with interface circuitry 214 by which a control input is received from, and certain indicator outputs are provided to, the operator console. It is to be understood that interface circuitry 214 may be connected to any conventional digital command and monitor console, but is preferably connected to a multiplexed control and monitoring interface by which control inputs may be provided to, and indicator outputs provided by, the interface circuitry 214 in a multiplexed fashion, as is well known to one of ordinary skill in the art.

Control input terminals CONTROL and CONTROL RTN provide a means by which the solid state power controller may be turned on by the operator. Preferably, a 3–6 vdc CONTROL input turns on the controller, while a 0–2 vdc CONTROL input turns off the controller. Interface circuitry 214 is connected to current sensing and trip timing logic 212, so that turning on of the controller, via CONTROL results in corresponding generation by the interface circuitry 214 of output signal CNTRLP, which is validated by the current sensing and trip timing logic 212, which then responds by turning on the power seitch 206 via drive outputs DRIVE and DRIVEP.

Current sensing and trip timing logic 212, as a result of its load current sensing/processing and trip time computation functions, determines when either a "fast trip" or "timed trip" mode of operation should be entered by the solid state power controller. When either of these two modes of operation is called for, current sensing and trip timing logic 212 provides output signal TRIPOUT to interface circuitry 214 which, in turn, provides an output indicator to the operator via the output indicator terminals TRIP and TRIP RETURN.

The current sensing and trip timing logic 212 also functions to generate (via the interface circuitry 214) a status indicator output, indicating the status of the load voltage, that is to say, indicating "power on" or "power off" conditions in the load circuit. Accordingly, current sensing and trip timing logic 212 provides output signal STAOT to interface circuitry 214 which, in turn, provides a status indicator output to the operator via output terminals STATUS and STATUS RETURN.

The current sensing and trip timing logic 212, as previously mentioned, provides output signals DRIVE and DRIVEP. Current sensing and trip timing logic 212 is connected, at its output, to drive circuitry 216 for the purpose of providing these aforementioned output signals thereto.

Drive circuitry 216 receives an input voltage VCT from power supply 208. Current sensing and trip timing logic 212 (as previously mentioned) responds to input CNTRLP so as to issue drive outputs DRIVE and DRIVEP, and drive circuitry 216 responds to these drive outputs to initially turn on the power switch 206. Drive circuitry 216 responds to subsequent variations of drive inputs DRIVE and DRIVEP—such variations being in accordance with the current sensing and trip timing functions performed by the current sensing and trip timing logic 212— so as to selectively control the power switch, and thus provide full-cycle control of the AC power being delivered to the electrical load.

FIG. 3 is a diagrammatic representation of the power supply 208 and zero voltage crossing detector 210 of FIG. 2.

As previously mentioned, power supply 208 provides various D.C. voltages—V+, V−, VCT, VREF—for use by various components of the solid state power controller. The power supply 208 is connected to the common reference REF VS1.

The A.C. source 202 (FIG. 2) is connected to the primary side of transformer T1, the secondary side of which is connected to the power supply input terminals PS1 and PS2 (FIG. 3).

The A.C. voltage output of transformer T1 (FIG. 2) is full-wave rectified and filtered by the complementary diodes CR1 and CR6 of power supply 208 (FIG. 3). The full-wave rectified and filtered output thereof is applied to the emitter of current boosting transistor Q1 and, via resistor R31, as an unregulated input to terminal 3 of a switching regulator device Z1.

Switching regulator device Z1 is, preferably, an LM105 series regulator manufactured by National Semiconductor, Inc. and appearing in *Linear Databook* (1976), p. 1-7, published by National Semiconductor, Inc. The switching regulator Z1 primarily performs voltage comparison between inputs received at terminals 5 and 6 thereof, respectively, and as a result of such voltage comparison provides a base driver output via terminal 2 of the device Z1 to control the current boosting transistor Q1 (via its base). Finally, the LM105 series regulator is employed in this application as a switching regulator operating at an oscillation (switching) frequency of 30 kHz.

For the purposes of describing the operation of the power supply 208, presume that transistor Q1 is initially on, transistor Q1 being turned on by device Z1 (via terminal 2) in response to a comparison of the voltages at terminals 5 and 6, by which comparison it has been determined that the voltage at terminal 5 exceeds the voltage at terminal 6. Current boosting transistor Q1 thus is conductive, resulting in current flow through resistor R1 to charge capacitor C1, resulting in an increasing voltage at terminal 5 of the device Z1. At the same time, the collector current of transistor Q1 is applied to the primary winding (LP1 and LP2) of transformer T2. The current flowing through the primary coil of transformer T2 causes a build-up of voltage at capacitor C4, resulting in the voltage V+ output of power supply 208. Resistors R3 and R4, located at the input of terminal 6 of the device Z1, form a voltage divider network such that the V+ voltage established at capacitor C4 is voltage-divided, to produce the voltage at terminal 6 of the device Z1. Furthermore, the increased flow of current through resistor R3 results in reduction in the voltage at terminal 6.

Eventually, the voltage at terminal 5 exceeds the voltage at terminal 6, and device Z1 (as a result of the voltage comparison) turns off the transistor Q1. As a result, the collector voltage of transistor Q1 approximates zero (in actuality, it is slightly negative), and capacitor C1 discharges through diode CR2 toward capacitor C4 (via line LP1, transformer T2 (primary coil), and line LP2). As a result of this discharge action, the voltage at terminal 6 begins to build up, while the voltage at terminal 5 begins to recede. Eventually, when the voltage at terminal 6 exceeds the voltage at terminal 5, the device Z1 (as a result of voltage comparison) again turns on the current boosting transistor Q1, and the cycle begins anew.

As a result of the above-described operation of the power supply 208, the voltage V+ is maintained in capacitor C4. The voltage VCT is also provided by the capacitor C4. Finally, the voltage V− is provided at the junction between diode CR3 and capacitor C3, and results from the operation of the secondary coil of transformer T2 which is connected at its one side, via line LS1, to the diode CR3, and at its other side to REF VS1.

Capacitor C1 is provided between terminal 5 of the device Z1 and REF VS1, and capacitor C25 is provided between the emitter of transistor Q1 and REF VS1, both capacitors C1 and C25 being provided for the purpose of filtering.

As a result of operation of device Z1, an unregulated input applied to terminal 3 thereof undergoes regulation, and a regulated output is provided at terminal 8. Furthermore, a resistor R2 is connected to terminal 1 of the device Z1 for the purpose of providing current limiting so as to preclude overdriving of the device Z1, and resultant improper control of the current boosting transistor Q1. A reverse bias diode CR2 is provided between line LP1 (associated with transformer T2) and REF VS1 in order to ensure a properly biased conducting path between the primary coil of transformer T2 and capacitor C4.

A further section of power supply 208 produces the reference voltage VREF, and comprises an amplifier Z3, constant current diode CR5, resistors R8, R9 and R30, zener diode Z2, and capacitors C5 and C14.

The constant current source CR5 is provided for the purpose of providing greater regulation within this section of power supply 208. Resistors R8 and R9 are provided for the purpose of gain-setting the amplifier Z3. Capacitor C5 is provided for the purpose of stabilizing the operation of amplifier Z3. Capacitor C14 is provided for the purpose of filtering the D.C. signal occurring at the output of the amplifier C3 (specifically, the reference voltage VREF).

Finally, it is to be noted that amplifier Z3 is, preferably, an LM108 device manufactured by National Semiconductor, Inc., and appearing in *Linear Databook* (1976), p. 3–114, published by National Semiconductor, Inc.

The zero-voltage crossing detector circuit 210 may be any conventional zero-voltage crossing detector circuit, but a preferred embodiment thereof is also shown in diagrammatic form in FIG. 3.

The zero-voltage crossing detector circuit 210 comprises transistor Q2, diode CR4, and associated resistors R5, R6 and R7.

In operation, the A.C. voltage output of transformer T1 (FIG. 2) is applied, via line PS2 (FIG. 3), diode CR4, and voltage divider R5, R6, to the base of transistor Q2, the collector of which is connected, via resistor R7, to the V+ voltage source.

The zero-voltage crossing detector circuit 210 should, preferably, anticipate a negative-going zero crossing by a minimum of 20 microseconds and a maximum of 30 microseconds, providing a signal ZVC to be used by the current sensing and trip timing logic 212 (FIG. 2). Zero-voltage crossing anticipation is accomplished by the turning off of transistor Q2 (FIG. 3) 20-30 microseconds before the actual crossing of the voltage. Accordingly, the collector of transistor Q2 is connected to pull-up resistor R7 and, when the transistor Q2 turns off, the voltage ZVC goes high, providing an indication of zero-voltage crossing to current sensing and trip timing logic 212—specifically, to the monolithic device contained therein, the operation of which will be subsequently described.

Figure 4:
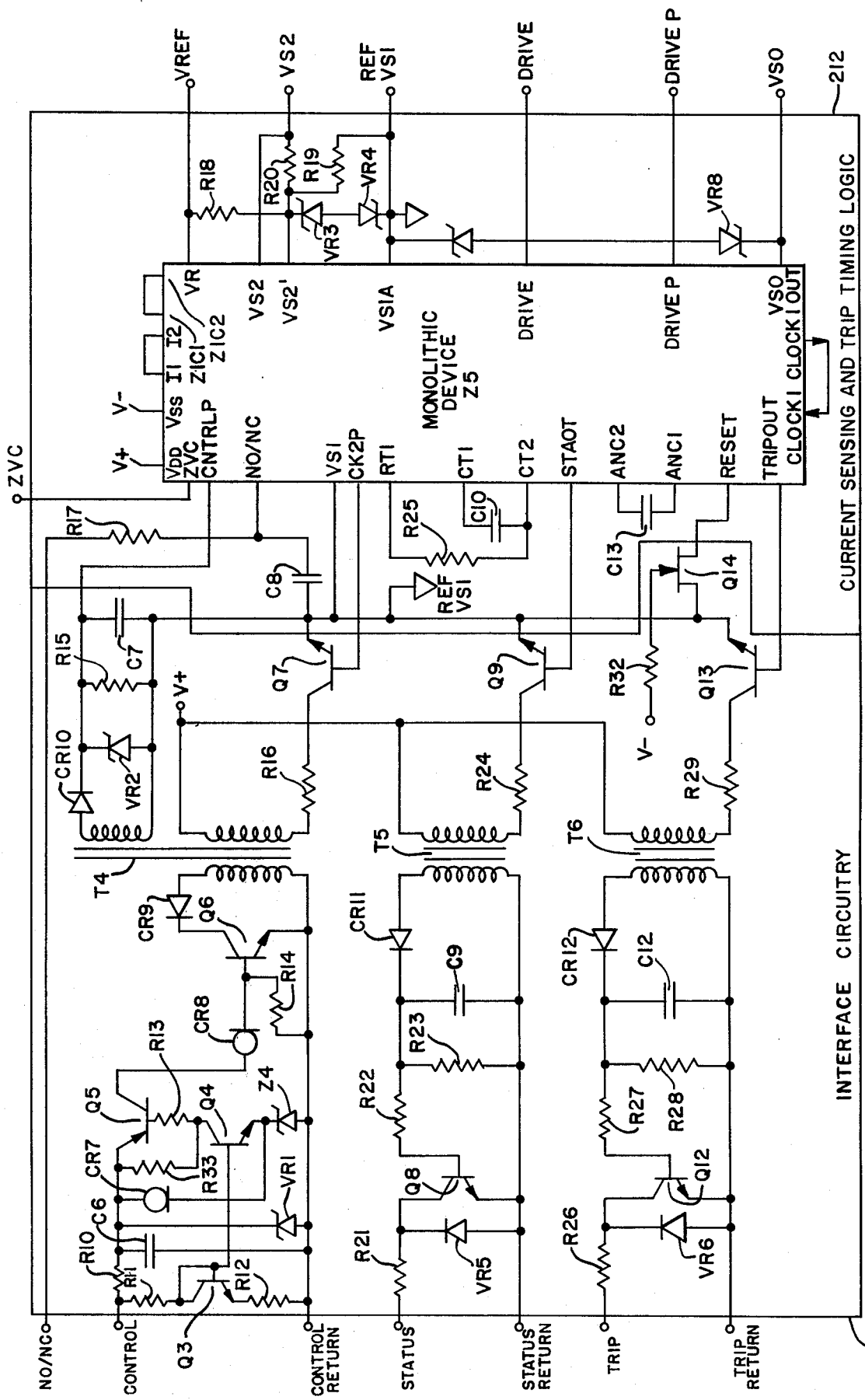
FIG. 4 is a diagrammatic representation of the current sensing and trip timing logic 212 and interface circuitry 214.

FIG. 4 is a diagrammatic representation of the current sensing and trip timing logic 212 and interface circuitry 214 generally set forth in FIG. 2.

As mentioned previously, the monolithic solid state power controller is provided with interface circuitry 214 by which a control input is received from, and status and trip indicator outputs are provided to, an operator console.

Interface circuitry 214 performs a control function, by which the monolithic device is turned on or turned off (or retained in an "off" condition), as follows. With reference to FIG. 4, so long as input CONTROL is maintained at 0-2 vdc, transistors Q3, Q5 and Q6 are maintained in the "off" condition. Transistor Q6 controls the three-winding pulse transformer T4 which operates in the "fly-back" mode.

More specifically, interface circuitry 214 includes a transistor Q7 which receives, at its base, a clock signal CK2P (provided by monolithic device Z5 in current sensing and trip timing logic 212), which clock signal is preferably a 100 kHz. pulse train. As a result of controlling the base of transistor Q7 with the pulse train CK2P, current flows during alternate half-cycles (for example, even half-cycles) from voltage supply V+ through the primary (lower right) coil of transformer T4, the resistor R16 and transistor Q7 to REF VS1. As a result, during such alternate (even) half-cycles when transistor Q7 is on, energy is stored in the primary coil of transformer T4. Then, during subsequent (odd) half-cycles, when transistor Q7 is off, in accordance with the "flyback" mode of operation of transformer T4, voltage reversal takes place, and energy is transferred to the secondary (upper right) coil of transformer T4 and, via diode CR10, to capacitor C7 wherein a voltage (preferably, 9 volts) is built up. This voltage build-up on capacitor C7 forces the CNTRLP terminal of the monolithic device Z5 to a "high" state, thus maintaining the monolithic device Z5 in the "off" condition.

Subsequently, when CONTROL achieves a 3-6 vdc voltage level, transistors Q4, Q5 and Q6 are turned on, and transformer T4 is closed. That is to say, during alternate (odd) half-cycles when transistor Q7 is off, energy stored in the primary (lower right) coil of transformer T4 during the previous (even) half-cycle is dissipated through the secondary (lower left) coil of transformer T4 and through diode CR9 into transistor Q6. As a result, capacitor C7 discharges and the voltage level at the CNTRLP terminal of monolithic device Z5 becomes lower in vvalue, and the monolithic device Z5 is turned on.

It is to be noted that transistors Q3 and Q4 are base-connected, and that transistor Q3 is configured in a common base-collector configuration. This special configuration of transistor Q3 is utilized to provide temperature tracking of transistors Q3 and Q4. Without temperature tracking, inefficient performance of the control function would result in that the 2-3 vdc band separating CONTROL "off" and "on" states would be increased.

It is also to be noted that the frequency of the 100 kHz. pulse train generated at the CK2P terminal of the monolithic device Z5 is controlled by the RC circuit made up of resistor R25 and capacitor C10 connected, in parallel, between terminals RT1, CT1 and CT2 of the monolithic device Z5.

Finally, it is to be recognized that the V+ voltage source connected to the primary coil of transformer T4 could easily be replaced by a pulse generator for turn-on and turn-off in a cycling mode of operation.

The status indication function of interface circuitry 214 is accomplished basically by means of transistor Q8, diode CR11, transformer T5 (operating in the fly-back mode), and transistor Q9.

STAOT is an output signal from the STAOT terminal of monolithic device Z5, and is maintained at the low voltage level (+0.6 volts or less) until enabled. So long as STAOT is not enabled, no energy is transferred through transformer T5 and diode CR11 to capacitor C9, and capacitor C9 discharges any voltage previously stored therein. As a result, transistor Q8 assumes the "off" condition, and thus presents a very high impedence to the operator console, via terminals STATUS and STATUS RETURN.

STAOT is enabled by the monolithic device Z5 and preferably consists of a 100 kHz. signal generated by the monolithic device Z5 in accordance with voltages VS0 and VS1 (as will be further explained below). Enabling of STAOT causes transistor Q9 to turn on, and energy stored (during alternate (even) half-cycles) in the primary of transformer T5 is transferred through transformer T5 and diode CR11 to capacitor C9 (during complementary (odd) half-cycles). As a result, capacitor C9 becomes charged, holding transistor Q8 in the "on" condition, and a very low impedance (preferably, 120 ohms or less) is presented to the STATUS and STATUS RETURN terminals.

Therefore, detection of a low impedance between the STATUS and STATUS RETURN terminals indicates that A.C. voltage is being supplied to the load, and detection of a high impedance between those terminals indicates that A.C. voltage is not being applied to the load.

The trip indication function of interface circuitry 214 is implemented in generally the same manner as the status indication function.

The TRIPOUT output of monolithic device Z5 is maintained "low" so long as a "fast trip" condition (overcurrent) or "timed trip" condition is not determined within the monolithic device Z5. However, when one of such conditions is determined, TRIPOUT assumes a "high" state (preferably, by generation of a 100 kHz. pulse train). Transistor Q13, previously in the "off" condition is turned on, and energy stored in transformer T6 during alternate (even) half-cycles is transferred through transformer T6 and diode CR12 to capacitor C12 during complementary (odd) half-cycles. As a result, voltage build-up at C12 occurs, maintaining transistor Q12 in the "on" condition, and the impedance between terminals TRIP and TRIP RETURN—previously high in value—assumes a low value.

Thus, a "no trip" condition appears at the operator console as a high impedance between the TRIP and TRIP RETURN terminals, while occurrence of a "trip" appears as a low impedance between those terminals.

Interface circuitry 214 contains an insulated gate field effect transistor (IGFET) Q14 with its gate connected, via resistor R32, to the V− voltage source, its source connected to the VS1 terminal of the monolithic device Z5, and its drain connected to the RESET terminal of the monolithic device Z5. Transistor Q14 serves to initialize the monolithic device Z5 once power is applied or turned on.

A particularly advantageous feature of the interface circuitry 214 resides in the fact that the control, status and trip portions of interface circuitry 214 employ, respectively, transformers T4, T5 and T6. These transformers T4, T5 and T6 provide magnetic isolation between those portions of the interface circuitry 214 on either side of the transformers T4, T5 and T6.

Current sensing and trip timing logic 212 comprises a partially analog/partially digital arrangement which, to the maximum extent possible, digitally implements the functions of load current sensing (via sensed voltages VS0 and VS2), trip time computation, overcurrent or timed trip detection, TRIP and STATUS output indication (via interface circuitry 214), and CONTROL input signal (provided by interface circuitry 214) processing and validation (for "turn on" of the monolithic device Z5). As also previously described, the monolithic device Z5, via its terminal NO/NC, enables the monolithic solid state power controller to operate in the "normally open switch" or "normally closed switch" mode of operation.

The monolithic device Z5 receives, via the ZVC terminal, the ZVC output of zero voltage crossing detector 210 (FIGS. 2 and 3). ZVC is high during the positive half-cycle of the PS2 input to the power supply 208 (FIG. 2). ZVC preferably consists of a pulse train with a repetition rate of 400 kHz.

The VS2 input to monolithic device Z5 (FIG. 4) is the current sense input, the voltage at VS2 corresponding to the solid state power controller load current measured in resistor RS, referenced to common reference REF VS1 (FIG. 2). VS2 is preferably a 400 Hz. full-cycle waveform.

With further reference to FIG. 4, signal VS2'—provided at the correspondingly designated terminal of monolithic device Z5—is preferably a 400 Hz. signal having a +3.0 vdc bias associated with it. Signal VS2 is applied to resistors R18, R19 and R20; R18 provides the +3.0 vdc bias to obtain input VS2', and R19 and R20 perform resistor division.

Terminal VS1A of monolithic device Z5 is connected to REF VS1 which is the analog circuitry reference for the solid state power controller. Similarly, terminal VS1 of the monolithic device Z5 is connected to REF VS1 and serves as a digital circuitry reference point.

Terminal VS0 of monolithic device Z5 is, with reference to FIGS. 2 and 4, the result of resistor-dividing the AC PWR OUT output of power switch 206 by resistors $R_a$ and $R_b$. As will be described below, VS0 preferably consists of a 400 Hz. A.C. input to the monolithic device Z5, and is utilized by device Z5 in performing the "voltage status" function.

With further reference to FIG. 4, the monolithic device Z5 of current sensing and trip timing logic 212 generates two drive outputs, DRIVE and DRIVEP, which are preferably high frequency signals of the order of 50 kHz. The outputs DRIVE and DRIVEP are enabled, in the "normally open switch" mode of operation, when the monolithic device Z5 is turned on—that is, when CNTRLP goes low in response to operation of interface circuitry 214. As will be explained in detail below, when CNTRLP is low for 5 milliseconds (as measured by an internal timer of monolithic device Z5), the next low-to-high transition in the A.C. source voltage waveform (as detected by the zero voltage crossing detector 210 (FIGS. 2 and 3) and as represented by the ZVC output of zero voltage crossing detector 210 provided to the monolithic device Z5 (FIG. 4) causes enablement of the drive outputs DRIVE and DRIVEP. Conversely, in the "normally closed switch" mode of operation, as determined by external connection of the NO/NC terminal of monolithic device Z5 to REF VS1, CNTRLP must be high for 5 milliseconds.

The drive outputs DRIVE and DRIVEP are disabled, "normally open switch" configuration, when the following conditions are both met: (1) CNTRLP is high for 5 milliseconds; and (2) when either the next negative-going zero crossing of load current is detected (by a zero current detector contained internally in the monolithic device Z5, as will be discussed below), or when an additional 2.5 milliseconds (as measured by an internal count operation within the monolithic device Z5) lapses.

Finally, monolithic device Z5 receives, at respective terminals $V_{DD}$, $V_{SS}$ and $V_R$, the reference voltages V+, V− and VREF provided by the power supply 208 (FIG. 2).

Figure 5:
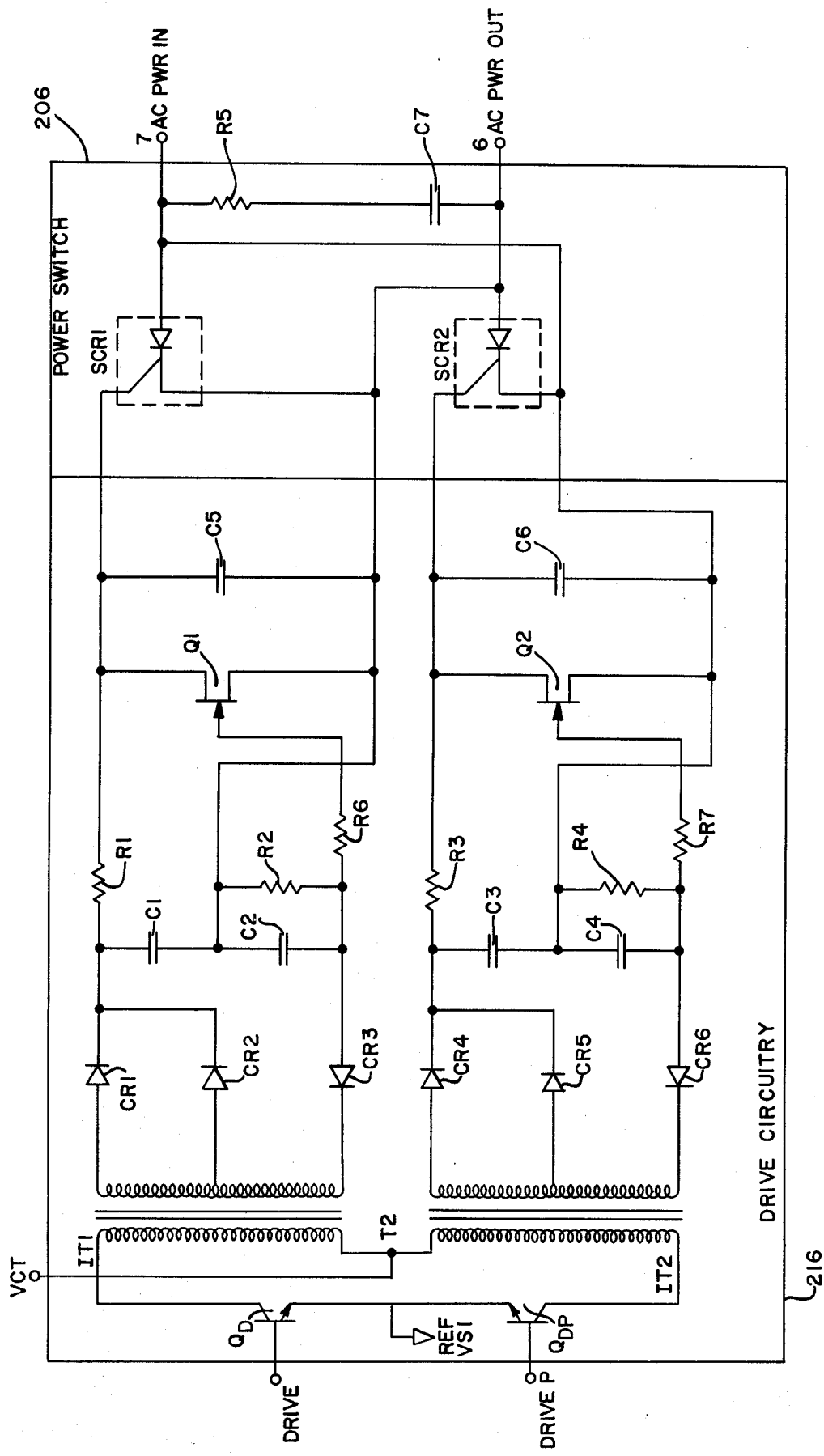
FIG. 5 is a diagrammatic representation of the drive circuitry 216 and power switch 206.

FIG. 5 is a diagrammatic representation of the drive circuitry 216 and power switch 206 generally set forth in FIG. 2.

Drive circuitry 216, as mentioned previously, receives drive outputs DRIVE and DRIVEP, and responds thereto so as to selectively control the power switch 206. Specifically, inputs DRIVE and DRIVEP are applied to transistors $Q_D$ and $Q_{DP}$, respectively, which transistors have their emitters commonly connected to REF VS1. Transistors $Q_D$ and $Q_{DP}$ have their collectors connected, via lines I1 and IT2, respectively, to corresponding portions of the primary coil of transformer T2, the latter transformer receiving reference voltage VCT (from power supply 208—FIG. 2) at its center tap.

Prior to enablement of drive circuitry 216 by inputs DRIVE and DRIVEP, IGFET's Q1 and Q2 are "on," and accordingly the control leads of silicon-controlled rectifiers SCR1 and SCR2 are not enabled.

Upon enablement of DRIVE and DRIVEP, transistors $Q_D$ and $Q_{DP}$ conduct during alternate half cycles of a 50 kHz. clock rate, resulting in a 180 degree phase difference between the operation of transistors $Q_D$ and $Q_{DP}$. As a result, energy is transferred through the respective portions of transformer T2 in complementary fashion. Negative voltages are built up on capacitors C2 and C4, resulting in application of a negative driving signal to the gates of IGFET's Q1 and Q2, respectively. IGFET's Q1 and Q2 are turned off, allowing a further build-up of voltage on capacitors C5 and C6. As a result, control leads of silicon-controlled rectifiers SCR1 and SCR2 are enabled, and the rectifiers SCR1 and SCR2 are turned on. Thus, A.C. source voltage from source 202 (FIG. 2) is permitted to pass through the power switch 206 to the load.

Conversely, non-enablement of (removal of signals from) DRIVE and DRIVEP results in the discharge—through resistors R2 and R4—of voltages built up in capacitors C2 and C4, respectively, such discharge taking place in a very rapid fashion. IGFET's Q1 and Q2 are then turned on, and capacitors C5 and C6 discharge through the IGFET's Q1 and Q2, resulting in the removal of the enabling input from the control leads of respective silicon-controlled rectifiers SCR1 and SCR2. Therefore, the silicon-controlled rectifiers SCR1 and SCR2 turn off, and A.C. source voltage from source 202 (FIG. 2) is blocked from passing through the power switch 206 to the load.

Figure 6A:
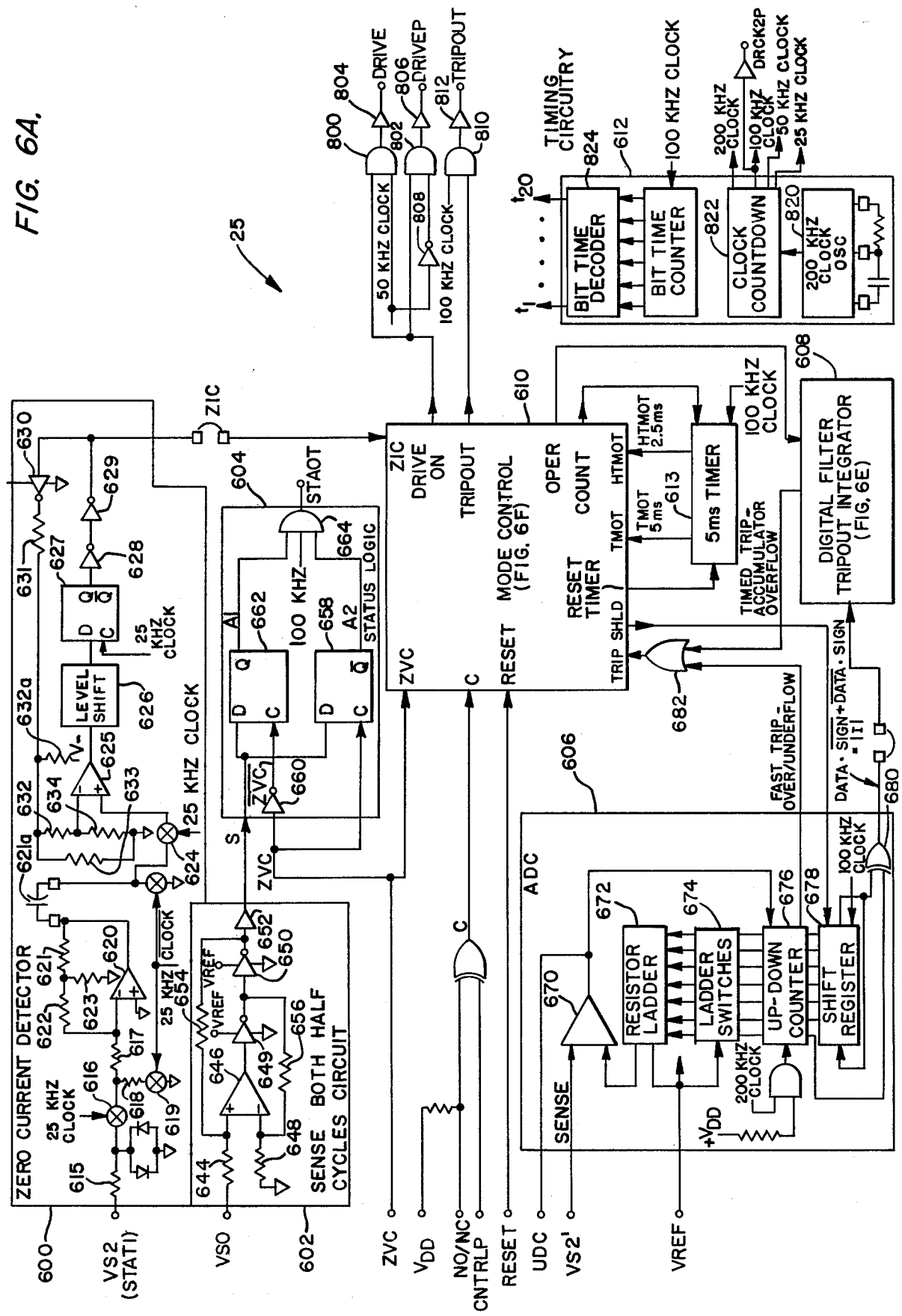
FIG. 6A is a diagrammatic representation of the monolithic device Z5.

FIG. 6A is a diagrammatic representation of the monolithic device Z5 contained in current sensing and trip timing logic 212 of FIG. 4.

Generally, monolithic device Z5 comprises the following basic components:

(1) A zero current detector circuit 600 responsive to sense input voltage VS2 (STATI)—which is proportional to the instantaneous load current—for detecting negative-going zero crossings in the load current, and indicating such crossings by output ZIC.

(2) A sense both half cycles circuit 602 responsive to the resistor-divided load voltage VS0 for monitoring the load voltage and detecting when both half-cycles thereof are present and of the proper amplitude, and indicating same by the output S.

(3) A status logic circuit 604 responsive to the output S of the sense both half cycles circuit 602, and to the zero voltage crossing indicator output ZVC (from zero voltage crossing detector 210—FIG. 3) for generating a status indicating output STAOT indicating whether or not voltage from source 202 (FIG. 2) is being applied to the load.

(4) An analog-to-digital converter (ADC) 606 (FIG. 6A) for comparing a biased sense input voltage VS2' and a reference voltage in order to control an up-down counting operation; for deriving the reference voltage by means of a resistor ladder/ladder-switching operation performed with respect to the digital up-down counter information and the input voltage VREF; for indicating—based on overflow or underflow resulting from the up-down counting operation—an overcurrent condition, necessitating a "fast trip" mode of operation (indicated by a FAST TRIP output); and for performing a further shifting/exclusive-OR operation to develop a serial bit output magnitude |I| representing the absolute value of the biased sense input voltage VS2', such serial bit output magnitude |I| being used by a further portion of the monolithic device Z5 in trip time computation.

(5) A digital filter trip out integrator 608 responsive to the output |I| of the analog-to-digital converter 606 for performing digital computation of trip time in accordance with a "timed trip" criterion, and issuing an output TIMED TRIP when the "timed trip" criterion has been met.

(6) A mode control circuit 610 responsive to occurrence of either FAST TRIP or TIMED TRIP to generate an output DRIVE ON, from which the DRIVE and DRIVEP outputs to drive circuitry 216 (FIG. 2) are derived, and further issuing an output TRIPOUT which is provided to interface circuitry 214 (FIG. 2) and which indicates the occurrence of a "trip" condition.

(7) Timing circuitry 612 (FIG. 6A) for providing various clock outputs and timing signals for controlling the operation of the aforementioned components of the monolithic device Z5.

Zero current detector 600 receives sense input voltage VS2 and gates that input voltage, via input resistor 615, gate 616 (enabled by a 25 kHz. clock output from timing circuitry 612), and resistor 617 to the negative input of operational amplifier 620, the positive input of which is connected to REF VS1. The junction between gates 616 and resistors 617 is connected to REF VS1 by resistor 618 in series with gate 619 (enabled by 25 kHz. clock). The output of operational amplifier 620 is connected, via feedback resistors 621 and 622 to its negative input, the junction of feedback resistors 621 and 622 being connected, via grounding resistor 623, to REF VS1.

The aforementioned elements of zero current detector 600 constitute a chopper-stabilized amplifier section thereof. The chopper-stabilized amplifier preferably has a gain of 20, and amplifies the input VS2 prior to comparison to a reference (in the remainder—a threshold detection portion—of zero current detector 600). Chopper stabilization of the input VS2 removes problems related to drift (which occur at high temperature).

The output of op amp 620 is provided to a capacitor 621a which provides D.C. restoration thereto. The D.C. restored output of capacitor 621a is then provided to the threshold detection portion of zero current detector 600. Specifically, the output of capacitor 621a is provided, via gate 624 (again, enabled by a 25 kHz. clock), to the positive input of comparator 625, the other input of which is connected through resistor 634 to REF VS1. The output of comparator 625 is level-shifted in level shifter 626, and the output of the level shifter 626 is provided as an input to the D-type flip-flop 627, the C-input of which is driven by a 25 kHz. clock. The Q output of the D-type flip-flop 627 is provided through inverters 628 and 629 to a VREF-controlled inverting amplifier 630. The output of inverter 629 forms the zero-current crossing indicator output ZIC. The output of VREF-controlled inverter 630 is provided, via feedback resistors 631 and 632 to the negative input of comparator 625. The output side of feedback resistor 631 is connected, via resistor 632a, to the V− voltage source, and is also connected, via grounding resistor 633, to REF VS1.

As previously mentioned, elements 624 through 634 form the threshold detection portion of zero current detector 600. As indicated by the above description, the threshold detection portion of zero current detector 600 operates in accordance with a feedback-controlled reference applied, via VREF-controlled inverting amplifier 630 and resistors 631 and 632, to the negative input of comparator 625. More specifically, when flip-flop 627 produces a "logic one" output, the output of inverting amplifier 630 is negligible, with the result that the V− voltage is applied, via resistors 632a and 632 to the negative input of comparator 625. Thus, a slightly negative reference voltage appears at the negative input of comparator 625. Conversely, when the output of flip-flop 627 is a "logic zero," VREF is applied to resistor 631. The parallel application of voltage VREF (via resistor 631) and V− (via resistor 632a)—through resistor 632—to the negative input of comparator 625 results in the generation of a slightly positive voltage at the negative input of comparator 625.

As a result of the above-described embodiment of zero current detector 600, once the output ZIC of zero current detector 600 achieves logic zero (0 v.), the input VS2 must go more negative than −16 mv. before the output ZIC will switch to logic one (+12 v.). Similarly, when the output ZIC is at logic one (+12 v.), the input VS2 must go more positive than +15 mv. before the output ZIC will switch back to logic zero (0 v.). In addition, zero current detector circuit 600 is provided with signal threshold circuitry having sufficient hysteresis—due to the reference voltage introduced through inverting amplifier 628 in the feedback loop of comparator 623 —to eliminate cross over jitter problems.

Sense both half cycles circuit 602 receives voltage VS0 and provides same, via input resistor 644, to the positive input of comparator 646, the negative input of which is connected via resistor 648 to REF VS1. The output of comparator 646 is provided via VREF-controlled inverting amplifier 649 and 650 to amplifier 652, the output S of which is provided as an input to status logic circuit 604. It is to be noted that the output of amplifier 650 is provided, via feedback resistor 654, to the positive input of comparator 646, and that the output of amplifier 649 is provided, via feedback resistor 656, to the negative input of comparator 646. As a result of the aforementioned feedback amplifier arrangement, the sense both half cycles circuit detects and provides (via output S) an indication of the presence of both half cycles of the voltage applied to the load in the source-load circuit.

The status logic circuit 604 receives the zero-voltage indicating output ZVC from zero voltage crossing detector 210 (FIG. 3), and provides the ZVC signal to the C input of delay flip-flop 658. Status logic circuit 604 also inverts the ZVC signal input, via inverter 660, and provides the inverted signal $\overline{ZVC}$ to the C input of delay flip-flop 662. The output S of the sense both half cycles circuit 602 is provided to the D inputs of each of flip-flops 658 and 662.

Figure 6B:
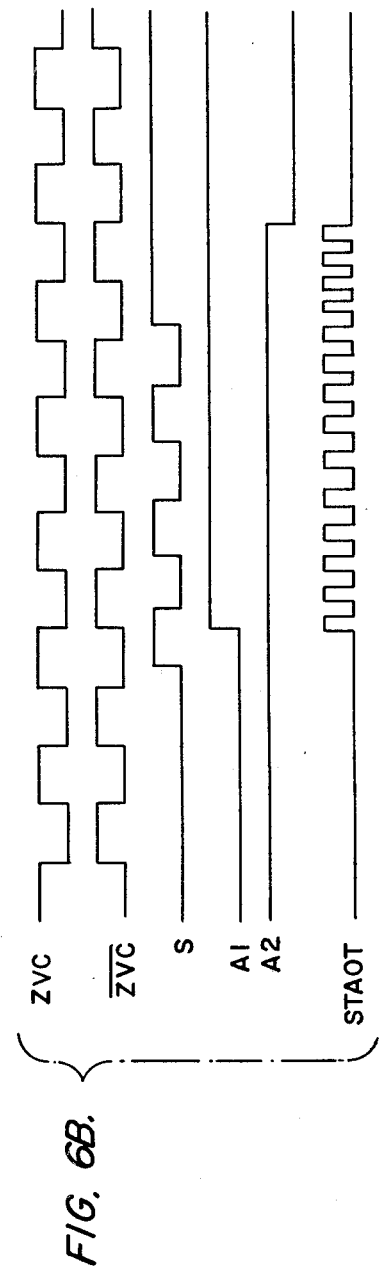
FIG. 6B is a timing diagram related to the operation of the status logic circuit 604.

FIG. 6B is a timing diagram relative to the above-mentioned inputs (ZVC, $\overline{ZVC}$ and S) to the status logic circuit 604 (FIG. 6A).

Referring to both FIGS. 6A and 6B, flip-flop 662 produces, at its Q output, signal A1, and flip-flop 658 produces, at its $\overline{Q}$ output, signal A2, both of signals A1 and A2 being provided to AND circuit 664. The AND circuit 664 also receives a 100 kHz. signal provided by timing circuitry 612.

As best seen in the timing diagram of FIG. 6B, simultaneous occurrence of flip-flop outputs A1 and A2 results in the generation of the 100 kHz. signal STAOT which is the aforementioned status indication output indicating that the source 202 (FIG. 2) is applying a voltage to the load.

Analog-to-digital converter 606 generally comprises analog comparator 670, resistor ladder circuit 672, analog ladder switches 674, 7-stage up-down counter 676, 6-bit recycling shift register 678, and exclusive-OR gate 680. In general terms, the ADC 606 tracks the sense input voltage VS2', and provides a serial bit output |I| that represents the absolute value of the sense input voltage VS2'.

More specifically, ADC 606 receives biased sense input voltage VS2' at one input of comparator 670, the other input of which receives an analog reference signal from resistor ladder circuit 672. The output of comparator 670 is provided to up-down counter 676, causing the up-down counter 676 to count up or down (in accordance with a 200 kHz. clock signal provided by timing circuitry 612 and a $+V_{DD}(V+)$ voltage received from power supply 208 (FIG. 2)) depending on the results of the comparison operation performed by comparator 670.

The contents of up-down counter 676 are provided in parallel to any conventional digital-to-analog converter (DAC) so as to convert the digital output of counter 676 to analog form. For example, the digital output of counter 676 is provided to the DAC network formed by resistor ladder 672 and ladder switches 674. Resistor ladder 672 and ladder switches 674 function in a manner to be described below to produce the analog reference signal applied, as a reference input, to the comparator 670.

Comparator 670 iteratively compares the sense input voltage VS2' to the reference input voltage from resistor ladder circuit 672. As a result of these iterative comparisons, the up-down counter 672 is successively commanded to increase or decrease its binary count—and therefore, to increase or decrease the analog output of the resistor ladder 672, until the sense input voltage VS2' and reference input voltage (to comparator 670) are within a very fine degree of resolution or tolerance, as represented by a ±1 bit difference between the contents of the ladder switches 674 and the up-down counter 676. At that juncture, the ADC 606 has successfully tracked the voltage VS2' applied thereto.

The contents of up-down counter 676, with the exception of the sign bit thereof, are provided in parallel to shift register 678 in response to enabling input SHLD generated by mode control 610. Shift register 678 functions as a recirculating shift register in accordance with a 100 kHz. clock from timing circuitry 612. Shift register 678 also functions as a parallel-to-serial converting register, such that the serial output thereof—besides being recirculated in shift register 678—is provided to one input of an exclusive-OR gate 680, the other input of which gate 680 receives the sign bit from the up-down counter 674.

The exclusive-OR gate 680 produces an output $|I| = $ DATA·$\overline{SIGN}$ + $\overline{DATA}$·SIGN. This output |I| is an approximation of the absolute value of the sense input voltage VS2' applied as an input to the ADC 606. The output |I| is provided to the digital filter tripout integrator 608 (to be discussed below). If, as a result of the counting operation performed by the up-down counter 674, the counter 674 reaches full-scale in either the positive or negative direction (overflow or underflow), counter 674 issues a FAST TRIP output which indicates that a catastrophic overcurrent situation exists. This FAST TRIP output is provided, via OR gate 682, to the TRIP input terminal of mode control 610.

Preferably, scaling of the ADC 606 is such that "plus full scale" amounts to +6 volts and "minus full scale" amounts to 0 volts. Table A (below) shows the various respective contents of up-down counter 676 (second column of the table) and shift register 678 (third column of the table) for various sense input voltages VS2' ranging from +6 volts to 0 volts. The resolution or value of the least significant bit will be 3/64 volts. Any sense input voltage VS' equal to or greater than +6 volts, or less than or equal to 0 volts, will effect (automatically) a FAST TRIP output from the up-down counter 676. Various sense input voltages VS2' between the values of 0 volts and +6 volts (exclusively) will cause an ADD command or a SUBT command (as indicated in the last column of Table A) to occur in the digital filter tripout integrator 608 (as will be further discussed below).

Figure 6C:
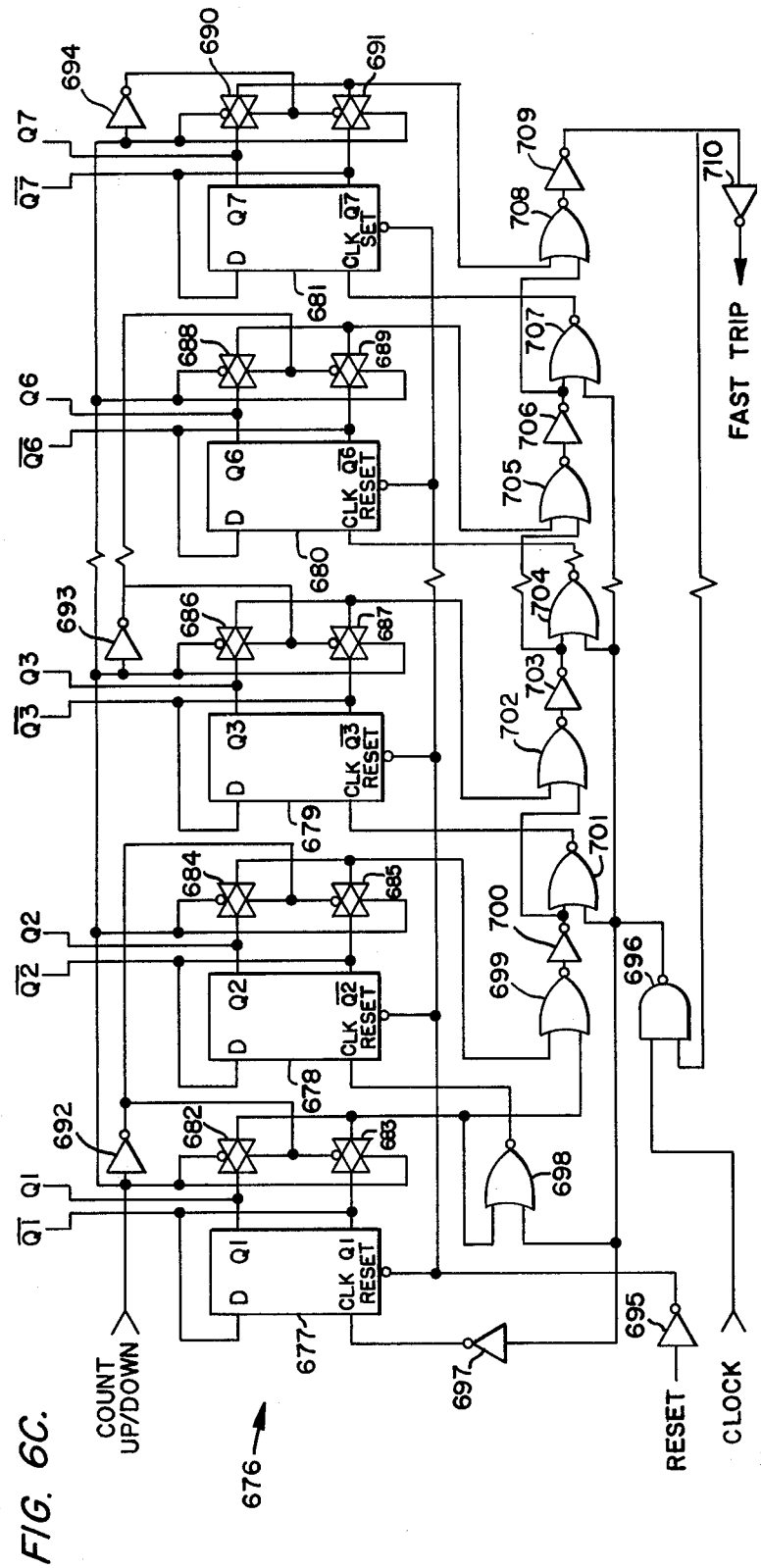
FIG. 6C is a diagrammatic representation of the up-down counter 676.

FIG. 6C is a diagrammatic representation of the up-down counter 676.

Up-down counter 676 comprises a series of delay flip-flops 677 through 681, interconnected as shown via gates 682 through 691. The count up/down signal—output of comparator 670 of ADC 606 (FIG. 6A)—is received at inverters 692 through 694 (FIG. 6C) of the up-down counter 676, and is provided after inversion as an enabling input to the gates 682 through 691.

TABLE A

| SENSE INPUT (VOLTS) | ADC COUNT B B B B B B B I I I I I I I T T T T T T T 7 6 5 4 3 2 1 | SHIFT REGISTER \|I\| B B B B B B I I I I I I T T T T T T 6 5 4 3 2 1 | COMMENTS |
|---|---|---|---|
| 6.000 | 1 1 1 1 1 1 1 | 1 1 1 1 1 1 | AUTOMATIC FAST TRIP |
| 5.953 | 1 1 1 1 1 1 0 | 1 1 1 1 1 0 | ADD |
| 4.501 | 1 1 0 0 0 0 0 | 1 0 0 0 0 0 | ADD |

TABLE A-continued

| SENSE INPUT (VOLTS) | ADC COUNT B B B B B B B I I I I I I I T T T T T T T 7 6 5 4 3 2 1 | SHIFT REGISTER \|I\| B B B B B B I I I I I I T T T T T T 6 5 4 3 2 1 | COMMENTS |
|---|---|---|---|
| 3.750 | 1 0 1 0 0 0 0 | 0 1 0 0 0 0 | ADD |
| 3.375 | 1 0 0 1 0 0 0 | 0 0 1 0 0 0 | ADD |
| 3.191 | 1 0 0 0 1 0 1 | 0 0 0 1 0 1 | I2 ADD |
| 3.188 | 1 0 0 0 1 0 0 | 0 0 0 1 0 0 | SUBT |
| 3.094 | 1 0 0 0 0 1 0 | 0 0 0 0 1 0 | SUBT |
| 3.047 | 1 0 0 0 0 0 1 | 0 0 0 0 0 1 | SUBT |
| 3.000 | 1 0 0 0 0 0 0 | 0 0 0 0 0 0 | SUBT |
| 2.953 | 0 1 1 1 1 1 1 | 0 0 0 0 0 0 | SUBT |
| 2.906 | 0 1 1 1 1 1 0 | 0 0 0 0 0 1 | SUBT |
| 2.959 | 0 1 1 1 1 0 1 | 0 0 0 0 1 0 | SUBT |
| 2.766 | 0 1 1 1 0 1 1 | 0 0 0 1 0 0 | SUBT |
| 2.719 | 0 1 1 1 0 1 0 | 0 0 0 1 0 1 | I2 ADD |
| 2.578 | 0 1 1 0 1 1 1 | 0 0 1 0 0 0 | ADD |
| 2.203 | 0 1 0 1 1 1 1 | 0 1 0 0 0 0 | ADD |
| 1.453 | 0 0 1 1 1 1 1 | 1 0 0 0 0 0 | ADD |
| 0.047 | 0 0 0 0 0 0 1 | 1 1 1 1 1 0 | ADD |
| 0.000 | 0 0 0 0 0 0 0 | 1 1 1 1 1 1 | AUTOMATIC FAST TRIP |

A reset input signal, typically generated when power is turned on, is provided, via inverter 695 to the reset terminals of the delay flip-flops 677 through 681. A clock input (200 kHz. clock in conjunction with the voltage $+V_{DD}$, as shown applied to the up-down counter 676 in FIG. 6A) is supplied to NAND gate 696, and is then provided (via inverter 697) to flip-flop 677, and (via NOR gates 698, 701, 704 and 707) to the clock input terminals of flip-flops 678 through 681, respectively.

The up-down counter 676 also includes a logic arrangement comprising NOR gates 698, 699, 701, 702, 704, 705, 707 and 708, as well as inverters 700, 703, 706, 709 and 710, which—in response to various Q1 and $\overline{Q1}$ outputs from the flip-flops 677 through 681—detects an overflow or underflow condition in the up-down counter 676, and accordingly generates a FAST TRIP command to the OR gate 682 associated with mode control 610 (FIG. 6A). Furthermore, the output $\overline{\text{FAST TRIP}}$ is applied as an input to NAND gate 696 which—via NOR gates 698, 701, 704 and 707—inhibits the clock input to the flip-flops 677 through 681, thus precluding up counting once the overflow has occurred, or down counting once an underflow has occurred.

Figure 6D:
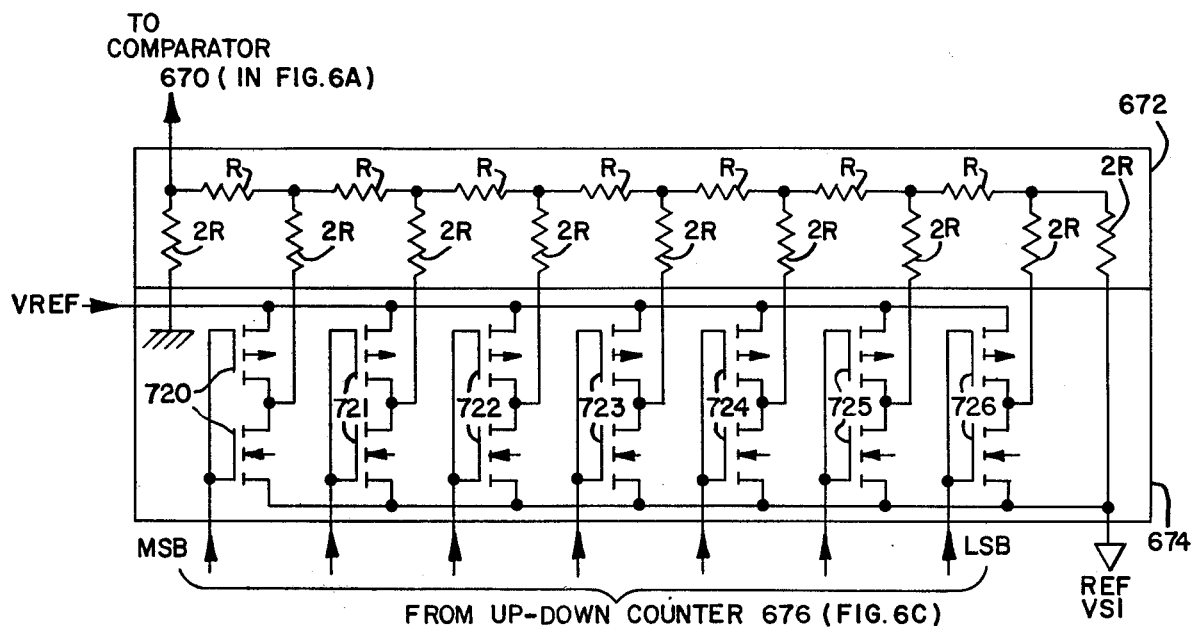
FIG. 6D is a schematic of the resistor ladder 672 and ladder switches 674.

FIG. 6D is a schematic diagram of the resistor ladder 62 and ladder switches 674.

Ladder switches 674 receive a 7-bit digital input from the up-down counter 676, as well as a VREF input from the power supply 208 (FIG. 2).

Referring further to FIG. 6D, the ladder switches circuit 674 consists of a plurality of individual analog ladder switches 720 through 726 which, in response to the receipt of logic zero or logic one bit inputs from respective stages of the up-down counter 676, selectively provide or do not provide, at their outputs, the voltage VREF.

Resistor ladder network 672 consists of various R and 2R resistors connected as shown in FIG. 6D. As a result of operation of the analog switches 720 through 726 in the ladder switch network 674, the voltage VREF is applied to selected ones of the 2R resistors in resistor ladder 672, such 2R resistors being connected to respective outputs of the gates 720 through 726.

As a result of the above-described operation, the resistor ladder network 672 produces, as an output, an analog voltage which represents the contents of the up-down counter 676 as provided to the ladder switch network 674.

It is to be understood that, in lieu of the specific embodiment of FIG. 6D, any digital-to-analog converter (DAC) could be substituted therefor to convert the contents of the up-down counter 676 to a corresponding analog voltage for input, as a reference voltage, to the comparator 670 in the ADC 606 (FIG. 6A).

Figure 6H:
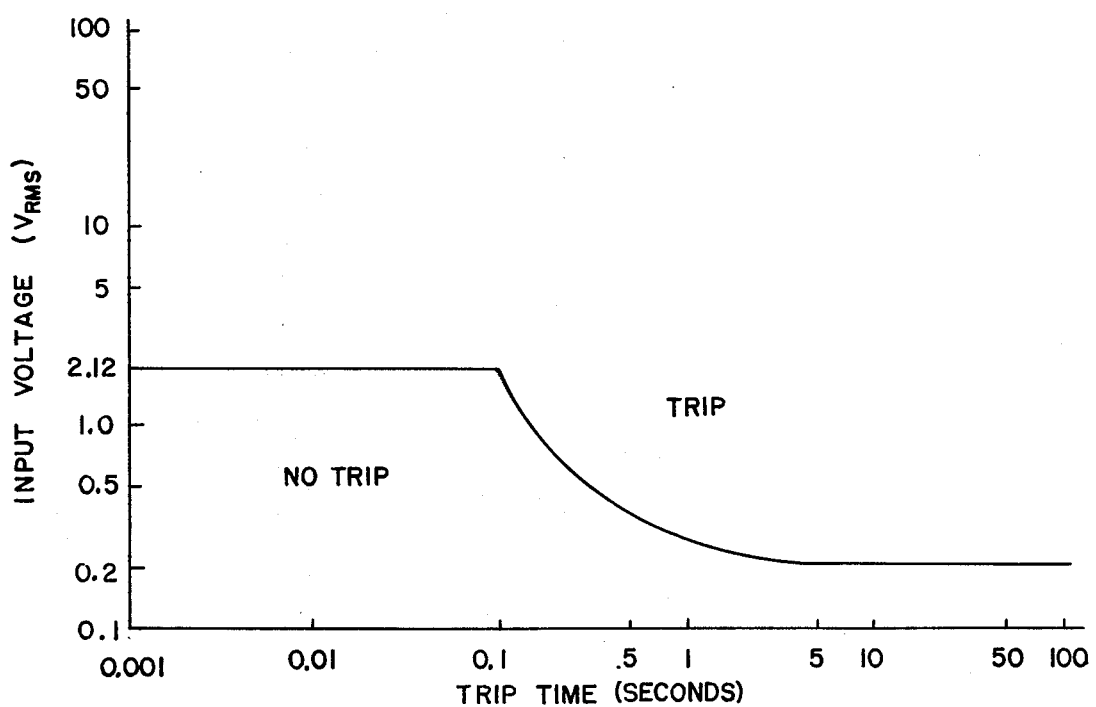
FIG. 6H is a graphical representation of the input voltage-trip time characteristic achieved by the present invention.
Figure 6E:
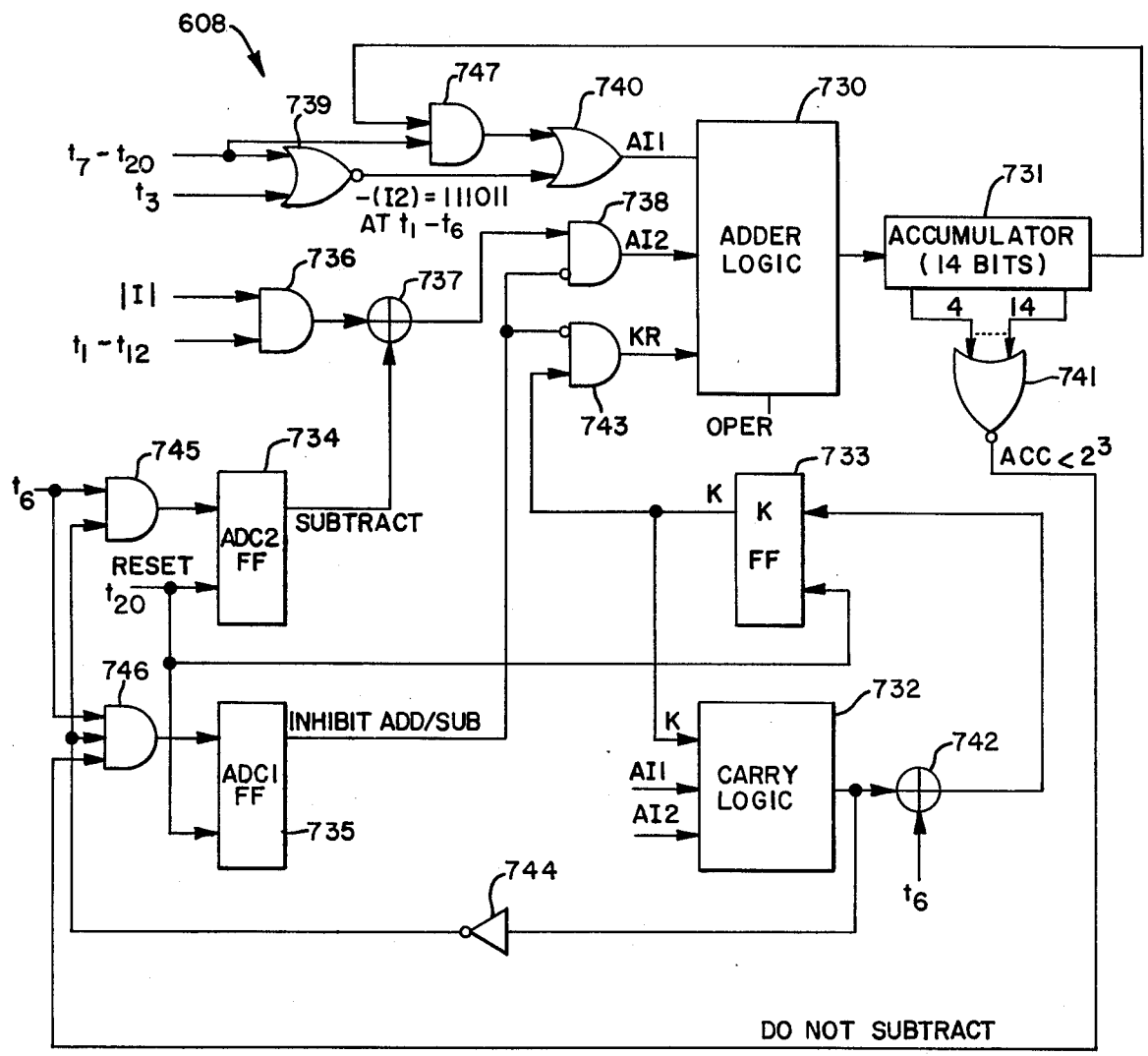
FIG. 6E is a diagrammatic representation of the digital filter and trip out integrator 608.
Figure 6E:
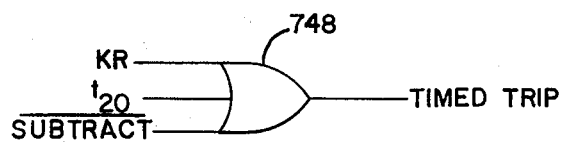

FIG. 6E is a diagrammatic representation of the digital filter and trip out integrator 608.

Digital filter and trip out integrator 608 generally comprises adder logic 730 and an associated accumulator 731 (e.g., a 14-bit register) for performing the trip time computation. Associated with the adder logic 730 is carry logic 732 and carry flip-flop 733. The digital filter and trip time integrator 608 further comprises a subtract flip-flop 734 (ADC2) and an inhibit flip-flop 735 (ADC1).

The aforementioned elements of digital filter and trip time integrator 608 operate in a highly synchronized fashion in accordance with bit time enabling signals $t_1$ through $t_{20}$ provided to the various logic gates to be identified and discussed below. Bit time enabling signals $t_1$ through $t_{20}$ are provided by timing circuitry 612 (FIG. 6A), as will be further discussed below.

The operation of the digital filter and trip out integrator 608 will now be described with reference to aforementioned FIG. 6E, and with further reference to FIG. 6G which is a flow chart of the operations performed by both the digital filter and trip out integrator 608 and the mode control 610 (FIG. 6A). Of particular interest in the description of the operation of the digital filter and trip out integrator 608 is that portion of the flow chart (FIG. 6G) labeled with a Y.

Referring to FIG. 6E, during bit times $t_1$ through $t_{12}$, the value |I|—received from ADC 606 (FIG. 6A)—is provided, via AND gates 736 and 748 (FIG. 6E) and exclusive-OR gate 737, to adder logic 730 as input AI2. During bit times $t_1$ through $t_6$, NOR gate 739 provides a value $-(I2)$ via OR gate 740 to adder logic 730 as input AI1. More specifically, NOR gate 739 is so enabled (by input $t_3$) so as to generate, during bit times $t_1$ through $t_6$, binary bits 111011 which is the two's complement of the value I2 indicated in Table A (above). Thus, the adder logic 730 sequentially operates on the 6-bit input |I| from up-down counter 676 (FIG. 6A) in conjunction with the 6-bit input representing $-(I2)$. In conjunction with this operation of adder logic 730, carry logic 732, which also receives the inputs AI1 and AI2, generates "carry" outputs which, during bit times $t_1$ through $t_5$, are passed through exclusive-OR gate 742 to carry flip-flop 733 which is set accordingly. The output of carry flip-flop 733 is provided both to carry logic 732 and, via AND gate 743, to the adder logic 730.

During bit time $t_6$, carry logic 732 generates either a logic one (indicating that $|I|$ is greater than or equal to I2) or a logic zero (indicating that $|I|$ is less than I2). In either instance, the output of carry logic 732 is provided, via exclusive-OR gate 742 (which receives the bit time signal $t_6$) in inverted form to the carry flip-flop 733. In the first instance, if $|I|$ is equal to or greater than I2, a logic one output from carry logic 732 is inverted by inverter 744 and disables AND gate 745, as well as AND gate 746. As a result, flip-flops 734 and 735 are reset (or remain reset) so that SUBTRACT and INHIBIT outputs thereof are (or remain) disabled. Conversely, if the output of carry logic 732 is logic zero (indicating $|I|$ greater than I2), the logic zero output is inverted by inverter 744, and is provided to both AND gates 745 and 746. Accordingly, AND gate 745, enabled by both bit time signal $t_6$ and the inverted carry output, sets flip-flop 734, and the SUBTRACT command is transmitted to exclusive-OR gate 737. In response to that command, exclusive-OR gate 737—which in the absence of a command merely passes through the value $|I|$ during bit times $t_1$ through $t_{12}$—functions to invert $|I|$ and provide same to adder logic 730, provided that the AND gate 738 s not disabled by the INHIBIT command from flip-flop 735.

If, during bit time $t_6$, the carry logic output is a logic zero, indicating $|I|$ less than I2, and the accumulator 731 contains a value less than $2^3$ (as detected by the NOR gate 741 which generates a DO NOT SUBTRACT command), AND gate 746 sets flip-flop 735 to issue the INHIBIT command which disables AND gates 738 and 743. This precludes transfer of $|I|$ or $-|I|$ to adder logic 730 through AND gate 738, and as well precludes transfer of the output of carry flip-flop 733 to adder logic 730 through AND gate 743 (via input line KR).

Figure 6F:
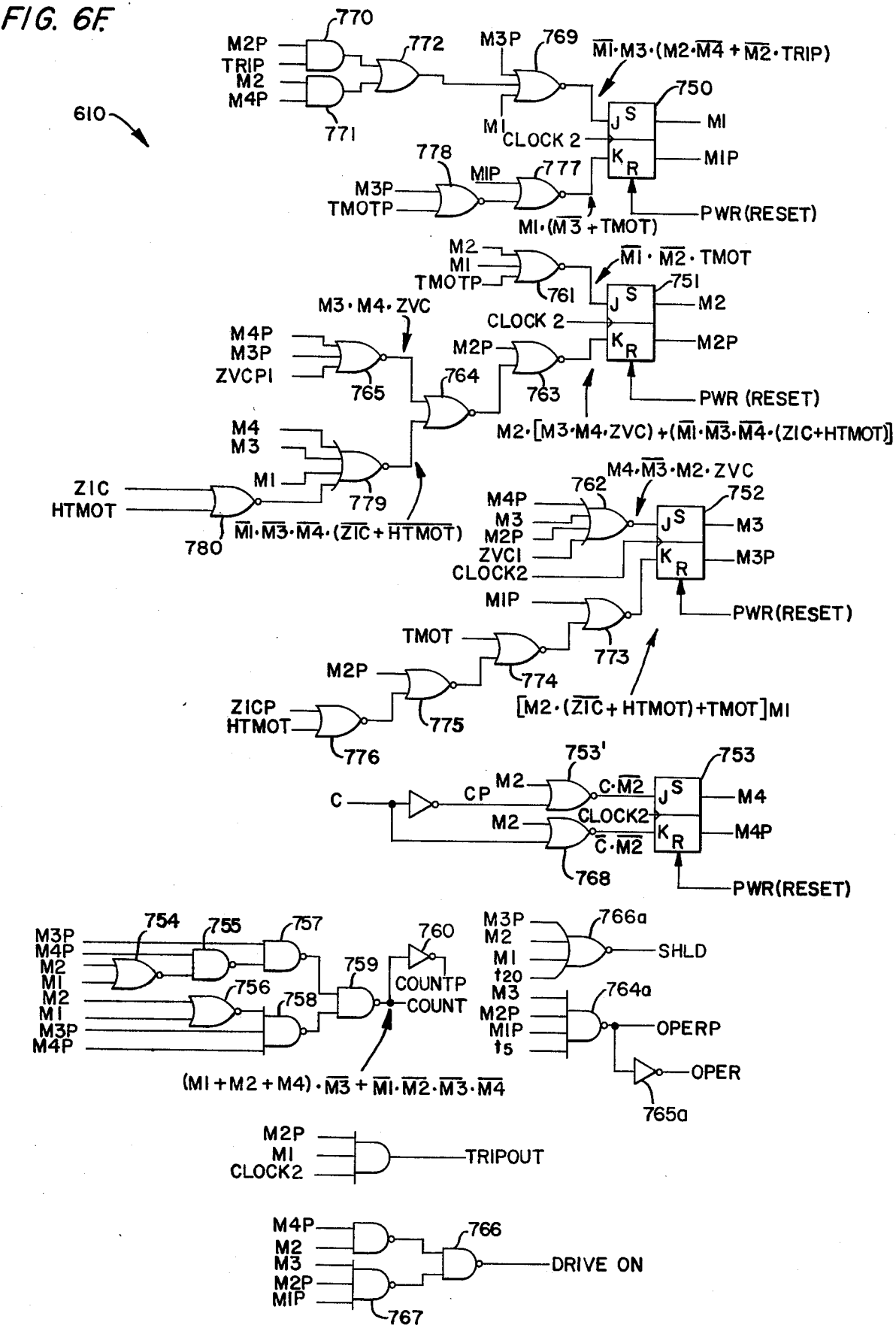
FIG. 6F is a diagrammatic representation of the mode control 610.
Figure 6G:
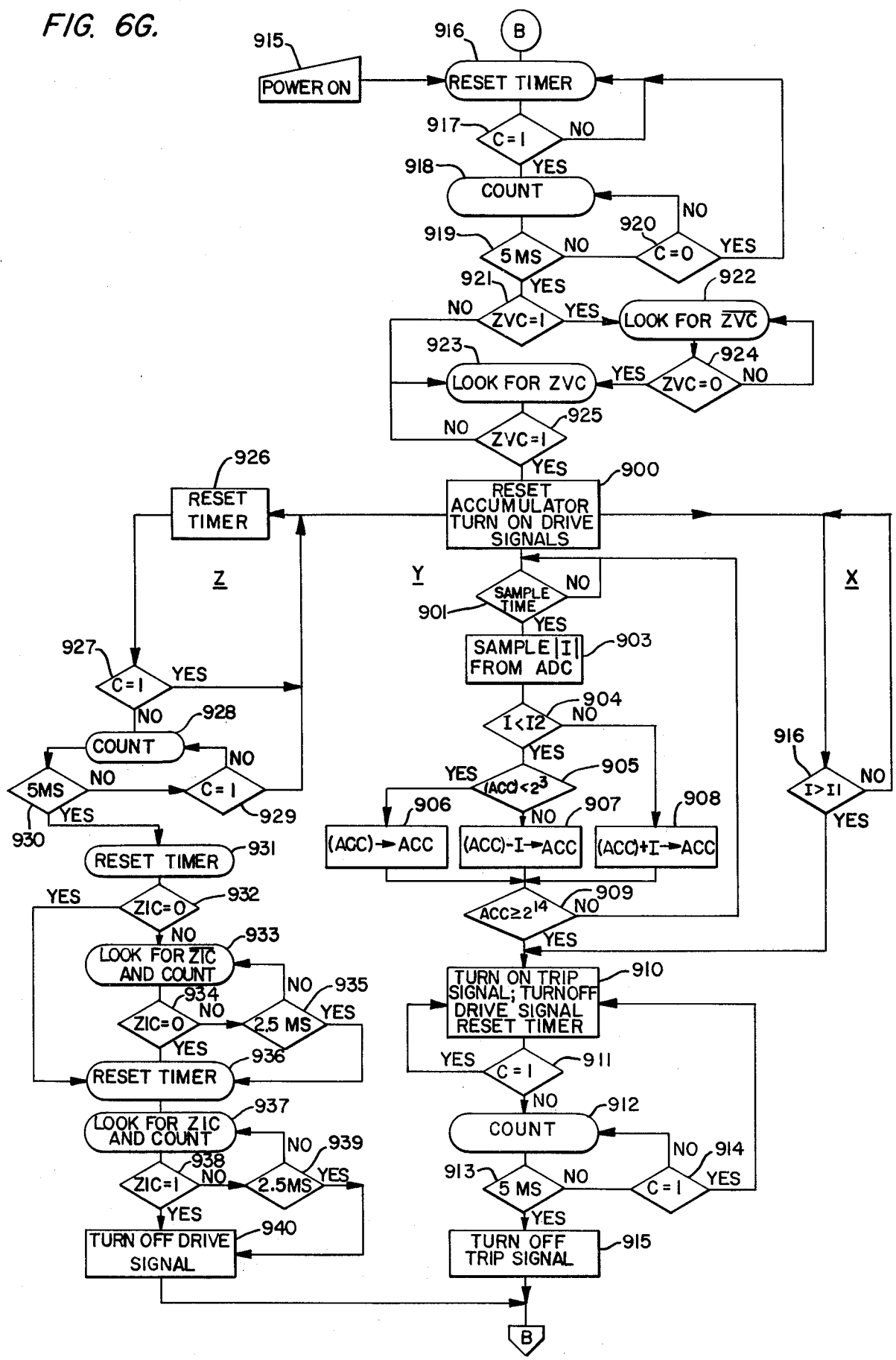
FIG. 6G is a flow chart of the operations performed by the digital filter and trip out integrator 608 and mode control 610.

Thus, with reference to the flow chart of FIG. 6G, the operation of digital filter and trip out integrator 608 (FIG. 6E) encompasses, during bit times $t_1$ through $t_6$, blocks 903, 904 and 905 (FIG. 6G). Specifically, prior to bit time $t_1$ the accumulator 731 (FIG. 6E) is reset—block 900 of FIG. 6G. Then, a check is made for existence of a sample time—block 901 of FIG. 6G—and the value $|I|$ from ADC 606 (FIG. 6E) is sampled—block 903 of FIG. 6G. Then, during bit times $t_1$ through $t_6$, the aforementioned operation of elements 730 through 746 takes place, implementing blocks 904 and 905 of FIG. 6G.

Referring to FIG. 6E, during bit times $t_7$ through $t_{12}$, the value $|I|$ is again passed through AND gate 736, exclusive-OR gate 737 ($|I|$ being complemented by gate 737 if the SUBTRACT command exists), and AND gate 738 to adder logic 730. However, during bit times $t_7$ through $t_{20}$, the $-(I2)$ input to OR gate 740 is inhibited by NOR gate 739, and rather the contents of accumulator 731 are recirculated, via AND gate 747 and OR gate 740 to adder logic 730 (via input AI1). Thus, adder logic 730 implements blocks 906, 907 or 908 of the flow chart of FIG. 6G. In the case of "$|I|$ less than I2" and "accumulator less than $2^3$," the AI2 input of adder logic 730 (FIG. 6E) is inhibited, and the contents of accumulator 731 are merely recirculated through the adder logic 730—see block 906 (FIG. 6G). If "$|I|$ less than I2" and "accumulator not less than $2^3$," the SUBTRACT command is issued by flip-flop 734 (FIG. 6E), and the value $|I|$ is subtracted (in adder logic 730) from the recirculated contents of accumulator 731—see block 907 (FIG. 6G). Finally, if "$|I|$ not less than I2," neither SUBTRACT nor INHIBIT is issued, and the value $|I|$ is added (in adder logic 730—FIG. 6E) to the recirculated contents of accumulator 731—see block 908 (FIG. 6G).

If, at time $t_{20}$, the SUBTRACT command is off, and input KR to adder logic 730 indicates a carry output of logic one from carry flip-flop 733, an overflow of accumulator 731 is indicated, and therefore, the determination "accumulator equal to or greater than $2^{14}$" (block 909 of FIG. 6G) is made. This particular condition, when detected by AND gate 748 (FIG. 6E) results in the generation, by digital filter and trip out integrator 608, of the TIMED TRIP integrator output which is transmitted, via OR gate 682 (FIG. 6A), to the mode control 610. This implements "turn on" trip signal (block 910 of FIG. 6G).

Finally, during time $t_{20}$, flip-flops 733, 734 and 735 are reset, as are the various other elements of the digital filter and trip out integrator 608.

FIG. 6F is a diagrammatic representation of the mode control 610.

Generally, mode control 610 comprises flip-flops 750 through 753 which, by their various "set" and "reset" states, designate a particular mode established by the mode control 610. The flip-flops 750 through 753 have respective "set" outputs which are designated M1, M2, M3 and M4, respectively. The corresponding "reset" outputs of the flip-flops 750 through 753 are designated M1P, M2P, M3P and M4P. As was the case with the digital filter and trip out integrator 608 (FIG. 6E), the mode control 610 (FIG. 6F) operates in a highly synchronized fashion, the various elements thereof being synchronized by a 100 kHz. clock signal generated by timing circuitry 612 (FIG. 6A), and designated CLOCK2.

The operation of mode control 610 (FIG. 6F) will now be described with reference to corresponding blocks of the flow chart of FIG. 6G.

Once power is turned on (block 915 of FIG. 6G), a timer 613 (FIG. 6A) is reset (see block 916 of FIG. 6G), and the various flip-flops 750 through 753 are reset, as indicated by the PWR (RESET) designator in FIG. 6F. The timer 613 (FIG. 6A) is capable of counting for 5 milliseconds, at which time the output TMOT is generated, or for 2.5 milliseconds, at which time the output HTMOT is generated. Outputs TMOT and HTMOT are provided to the mode control 610 (FIG. 6F). Upon occurrence of the "power on" and "reset timer" events, the previously mentioned input C to mode control 610 is checked for "logic one" condition. When C assumes logic one, flip-flop 753 is set by NOR gate 753', and COUNT is issued by logic gates 754 through 759 (the conditions M4 and $\overline{M3}$ being met). The command COUNT by mode control 610 causes timer 613 (FIG. 6A) to start counting. Thus, blocks 917 and 918 of FIG. 6G are implemented.

After the passage of 5 milliseconds, as indicated by TMOT, flip-flop 751 is set by NOR gate 761, implementing block 919 of FIG. 6G.

When ZVC equals logic one (block 921 of FIG. 6G), flip-flop 752 is set by NOR gate 762. Then, flip-flop 751 is reset by NOR gates 763, 764 and 765. This implements blocks 922 through 925 of FIG. 6G. It also causes generation of OPER by gate 764a and inverter 765a. OPER enables adder logic 730 (FIG. 6E), and resets the accumulator 731. The drive signal DRIVE ON is turned on (by NAND gates 766 and 767—FIG. 6F). In addition, command SHLD is generated by NOR gate 766' (FIG. 6F) every $t_{20}$ (last bit time of the cycle), and this enables transfer of the contents of up-down counter 676 to shift register 678 in ADC 606 (FIG. 6A). Thus, block 900 of FIG. 6G is implemented.

When input C to mode control 610 (FIG. 6F) is removed, flip-flop 753 is reset by NOR gate 768. This implements blocks 926 and 927 of FIG. 6G. The command COUNT is generated by gates 754 through 759 (FIG. 6F), and counting begins in accordance with block 928 of FIG. 6G.

When 5 milliseconds pass, as indicated by TMOT, flip-flop 751 is set by NOR gate 761, and the timer 613 (FIG. 6A) is reset, thus implementing blocks 928 through 931 of FIG. 6G.

Flip-flop 750 is then set by NOR gate 769, in conjunction with AND gates 770 and 771 and OR gate 772.

Timer 613 (FIG. 6A) begins to count under the influence of COUNT generated by gates 754 through 759, and, upon the passage of 2.5 milliseconds (HTMOT), or the occurrence of a logic zero at ZIC, flip-flop 752 is reset by NOR gates 773 through 776. This implements blocks 932 through 936 of FIG. 6G.

Subsequently, flip-flop 750 is reset by NOR gates 777 and 778. Then, upon either the passage of 2.5 milliseconds (HTMOT) or the occurrence of logic one at ZIC, flip-flop 751 is reset by NOR gates 763, 764, 779 and 780, and blocks 937 through 940 of FIG. 6G are implemented.

The above description of the operation of mode control 610 covers the turn-on procedure (via control C applied as an input to mode control 610), such turn-on procedure being set forth in blocks 915 through 952, and 900 of the flow chart of FIG. 6G. The above description also encompasses7the normal turn-off procedure, by removing the control input C from mode control 610, as set forth in blocks 926 through 940 of FIG. 6G.

Referring further to FIG. 6G, the process of computing a timed trip, as carried out by digital filter and trip out integrator 608 (FIG. 6A), has been previously described in detail with respect to the operation of digital filter and trip out integrator 608 (FIG. 6F), and encompasses the operation represented by blocks 901 through 910 in the center portion (designated "Y") of the flow chart of FIG. 6G. The remaining blocks 911 through 915 of FIG. 6G are carried out by the mode control 610 (FIG. 6F), as follows.

Upon occurrence of a FAST TRIP or TIMED TRIP condition, as indicated by respective outputs from up-down counter 676 and the digital filter and trip out integrator 608 (FIG. 6A), and as indicated to mode control 610 via input TRIP (FIGS. 6A and 6F), the flip-flop 750 is set by gates 769 through 772.

Subsequently, when input C is removed (as indicated by the block 911 of FIG. 6G), the flip-flop 753 is reset by NOR gate 768 (FIG. 6F). Timer 613 (FIG. 6A) then begins to count for 5 milliseconds.

Upon the passage of 5 milliseconds, flip-flop 750 is reset by gates 777 and 778, and flip-flop 752 is reset by gates 773 through 776. Thus, blocks 913 through 915 of FIG. 6G are implemented.

Finally, referring to FIG. 6G, the right-hand portion of the flow chart (designated "X") represents the occurrence of FAST TRIP when the value of |I| exceeds the value I1—block 916. The function of block 916 of FIG. 6G is, as has already been described, implemented by the ADC 606, and specifically, the up-down counter 676 (FIG. 6A). Once such FAST TRIP occurs, the flow chart of FIG. 6G branches to block 910, and the mode control 610 (as shown in FIG. 6F and described above) implements the remaining blocks 911 through 915 of FIG. 6G.

Returning to FIG. 6A, the above description demonstrates how the mode control 610 generates the output DRIVE ON.

The output DRIVE ON of mode control 610 is provided to AND gates 800 and 802, and amplifiers 804 and 806, respectively. The other input of AND gate 800 is enabled by CLOCK3, a 50 kHz. clock signal provided by timing circuitry 612. The other input of AND gate 802 is enabled by an inverted version of CLOCK3, provided by inverter 808. Amplifiers 804 and 806 produce at their outputs the drive output signals DRIVE and DRIVEP which are then provided to the drive circuitry 216 (FIG. 2).

The output TRIPOUT of mode control 610 (FIG. 6A) is provided to one input of AND gate 810, the other input of which receives CLOCK2, a 100 kHz. clock signal provided by timing circuitry 612. The output of AND gate 810, when amplified in amplifier 812, forms the signal TRIPOUT provided to interface circuitry 214 (FIG. 2).

With further reference to FIG. 6A, timing circuitry 612 comprises a clock pulse generator 820 generating CLOCK1, the 200 kHz. clock signal utilized by the up-down counter 676 of the analog-to-digital converter 606. Connected to clock pulse generator 820 is clock countdown circuit 822 (which could be a conventional frequency-dividing circuit), and which—based on the 200 kHz. clock signal (CLOCK1) from generator 820, generates further clock signals at a rate of 100 kHz. (CLOCK2), 50 kHz. (CLOCK3), and 25 kHz. (CLOCK4).

FIG. 6H is a graphical representation of the operation of the above-described monolithic solid state power controller. Specifically, in FIG. 6H, the input voltage (root-mean-square thereof) is plotted versus trip time (in seconds). Thus, in accordance with the operation of the above-described power controller, the occurrence of an input voltage equal to or greater than 2.12 volts results in an immediate FAST TRIP condition, as detected by the up-down counter 676 in ADC 606 (FIG. 6A).

The occurrence of an input voltage of 1.0 volts (as a further example) will cause the digital filter and trip out integrator 608 (FIG. 6A) to accumulate trip time, and to generate a TIMED TRIP output after the passage of approximately 0.15 seconds (as indicated by overflow of the accumulator 731 in digital filter and trip out integrator 608—FIG. 6E). Finally, the occurrence of an input voltage less than 0.2 volts will cause the accumulator 731 in digital filter and trip out integrator 608 (FIG. 6A) to not accumulate trip time, with the result that such a low input voltage may be maintained (in accordance with the curve of FIG. 6H) for an indefinite period of time.

Figure 7A:
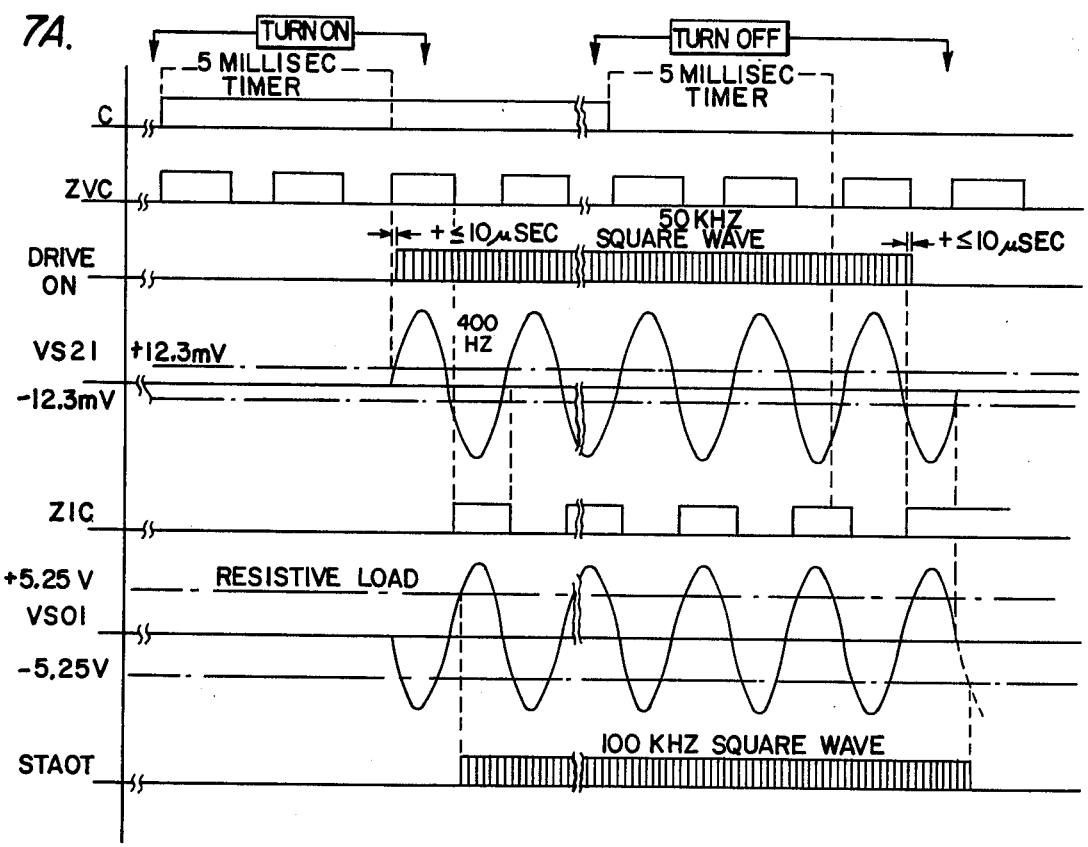
FIG. 7A is a timing diagram depicting "turn on" and "turn off" operations of the invention.

FIG. 7A is a timing diagram which described the "turn on" and "turn off" procedures for the monolithic solid state power controller, as already described above.

It is to be noted that the solid state power controller, upon application of C input (first line of FIG. 7A), will delay turn on for 5 milliseconds, as determined by the timer 613 (FIG. 6A). Similarly, upon the removal of C, the solid state power controller will delay turn off until such removal has been validated for 5 milliseconds, as determined by the timer 613.

The output DRIVE ON of mode control 610 is, in accordance with the third line of FIG. 7A, in the "on" condition once the initial 5-millisecond time period (related to the "turn on" condition) lapses, but DRIVE ON is not disabled until more than 5 milliseconds (specifically, 7.5 milliseconds—the total of TMOT and HTMOT or time to ZIC) after the removal of C.

FIG. 7A demonstrates an important feature of the present invention, in that—as a result of the operator-initiated command C, not only is a 5 millisecond time delay imposed (for the purpose of validating the command C), but also the enabling DRIVE ON is not generated by the mode control 610 (FIG. 6A) until the voltage waveform ZVC (FIG. 7A) indicates ZVC=1, that is, indicates that a zero voltage crossing has occurred in the source voltage.

The representation, in the timing diagram of FIG. 7A, demonstrates an important feature of the present invention, in that—as a result of operator removal of command C—not only is a 5 millisecond time delay imposed, but also the disabling of DRIVE ON is not completed by the mode control 610 (FIG. 6A) until the load current waveform ZIC (FIG. 7A) indicates ZIC (that is, indicates that a positive-going zero current crossing has occurred in the load circuit), or until 2½ milliseconds have elapsed.

The representation, in the timing diagram of FIG. 7A, of the signal STAOT also indicates the fact, already described above, that the status logic 604 (FIG. 6A) generates STAOT so long as power is being applied to the load.

Figure 7B:
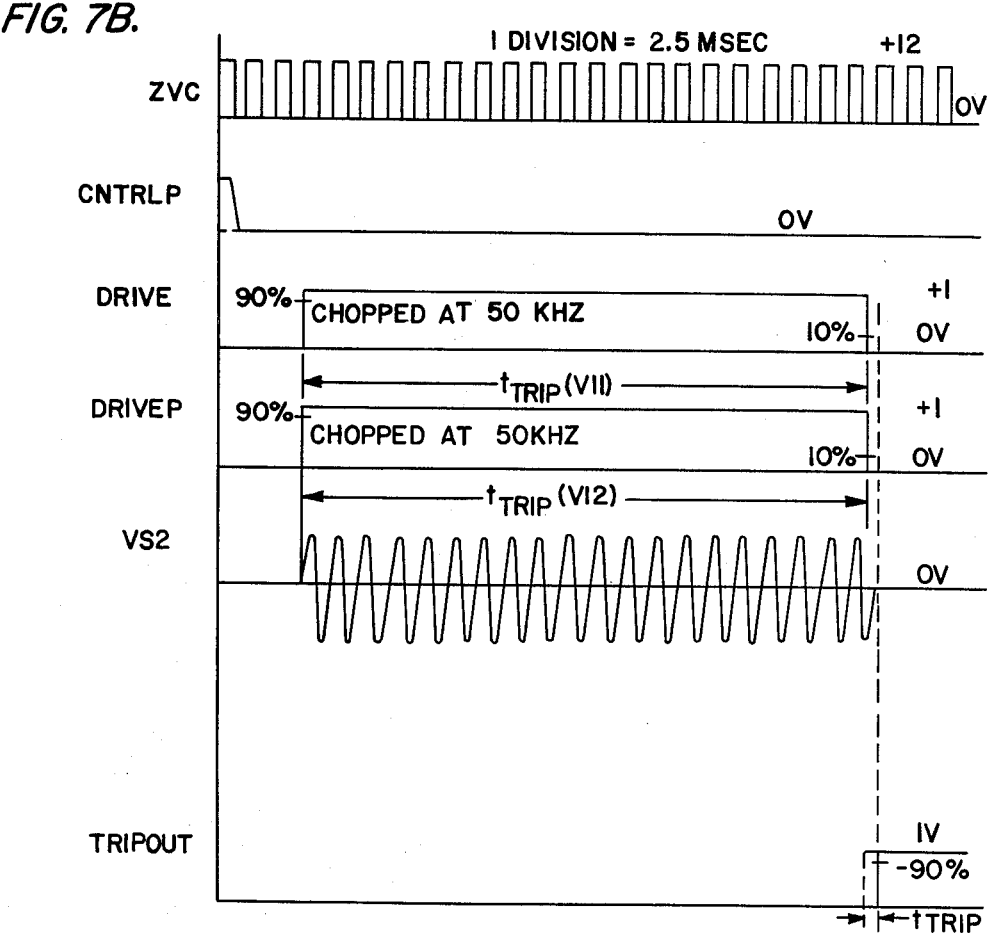
FIG. 7B is a timing diagram depicting the "trip out" operation performed by the invention.

FIG. 7B is a timing diagram related to the TRIPOUT condition and operation of the monolithic solid state power controller. Thus, upon occurrence of a TRIPOUT condition, DRIVE and DRIVEP are disabled and, a short time later, a signal TRIPOUT is generated by mode control 610 (FIG. 6A) so as to indicate the occurrence of a "trip" condition.

More specifically, FIG. 7B demonstrates another important feature of the present invention, in that the occurrence of a TRIPOUT condition in the monolithic solid state power controller results in interruption of the source voltage applied to the load (as indicated by elimination of the DRIVE and DRIVEP input waveforms) regardless of zero current crossings of the load current, as indicated by the VS2 waveform of FIG. 7B.

Figure 8:
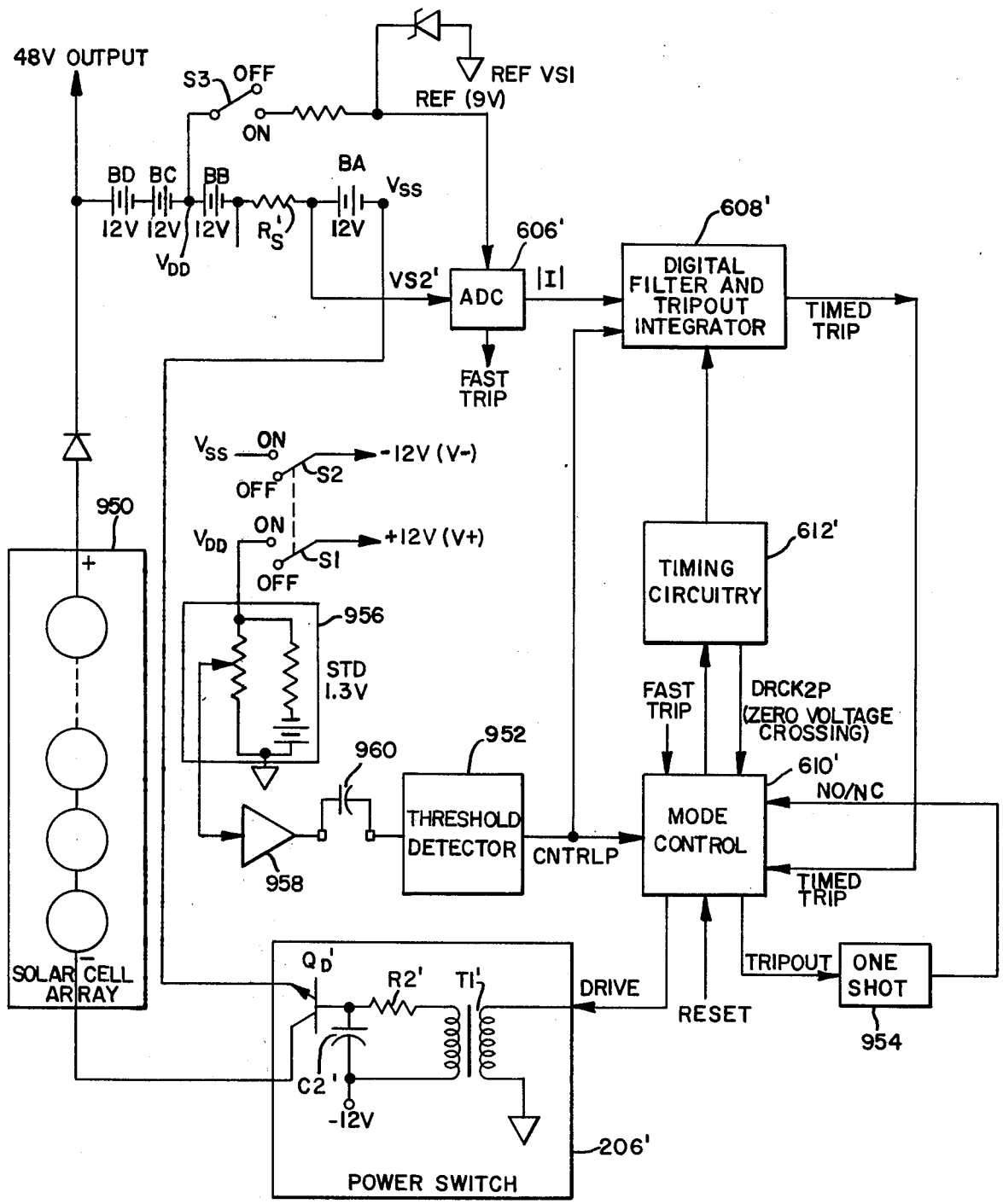
FIG. 8 is a diagrammatic representation of the monolithic solid state power controller of the present invention employed in a D.C. power system.

FIG. 8 is a diagrammatic representation of an implementation of the monolithic solid state power controller of the present invention in a D.C. power system.

More particularly, the D.C. power system of FIG. 8 comprises a series-connected array of batteries BA through BD which produce a 48 volt output for provision to a load (for example, a marine stove located on a seagoing vessel). For the purpose of refreshing the energy of the batteries BA through BD, these batteries are connected in series with a solar cell array 950 which recharges the batteries BA through BD, but which is also connected in series with a power switch 206'. The power switch 206' is a simplified version of the previous power switch 206 shown in FIG. 5.

The monolithic solid state power controller employed in this D.C. system comprises an ADC 606' connected to the output of a sense resistor $R_s'$, digital filter and trip out integrator 608', mode control 610', and timing circuitry 612'. The aforementioned elements 606', 608', 610' and 612' are constituted as previously disclosed and discussed above with reference to FIGS. 6A, 6E and 6F.

In operation, the ADC 606' receives the sense voltage VS2', and accordingly generates the value $|I|$, as well as the output FAST TRIP upon occurrence of an overcurrent condition. Digital filter and trip out integrator 608' receives the value $|I|$ from the ADC 606' as well as an output of a threshold detector circuit 952, and generates the TIMED TRIP output in the manner already described above with respect to digital filter and trip out integrator 608.

The mode control 610' receives a CNTRLP input from the threshold detector 952, and accordingly (in the manner previously described with respect to "turn on" procedures) enables the power switch 206' via the DRIVE output. In addition, mode control 610' receives the FAST TRIP and TIMED TRIP outputs of the ADC 606' and digital filter and trip out integrator 608', respectively, and (in the manner previously described) generates TRIPOUT which activates one-shot multivibrator circuit 954, the output of which is provided as input NO/NC to the mode control 610'. This latter connection of output TRIPOUT, via one shot 954, to the NO/NC input of mode control 610' results in an "automatic resetting" capability of mode control 610' which is a specific feature of this D.C. application of the monolithic solid state power controller.

The D.C. arrangement of FIG. 8 also comprises a power switch, which is commonly represented by the switches S1, S2 and S3, for turning on the power controller. In addition, the D.C. arrangement comprises a standard 1.3 volt battery 956 for generating, in conjunction with $V_{DD}$ (V+), as well as switch S1, the STAT1 (VS2) input to an amplifier 958, the output of which is connected—via D.C. restoration capacitor 960—to the threshold detector 952.

The operation of the monolithic solid state power controller in a D.C. application will now be explained with further reference to FIG. 8.

Upon initial turn-on of the power controller, RESET command to mode control 610' will cause resetting of the 5 millisecond timer 613 (FIG. 6A). Referring to FIG. 8, the CNTRLP input to mode control 610' is derived from threshold detector 952 which monitors the voltage across battery BB via terminal voltage $V_{DD}$, battery 956, amplifier 958 (which is, preferably, a chopper-stabilized amplifier having a gain of 20), and D.C. restoration capacitor 960. By means of this arrangement, the threshold detector 952 determines that the battery arrangement BA through BD has adequate charge.

Five milliseconds after generation of CNTRLP, the mode control 610' will turn on DRIVE during the next ZVC input. However, it should be noted that, for this particular application, the ZVC input is provided by timing circuitry 612', specifically, the clock output DRCK2P thereof.

The output DRIVE of mode control 610' will provide (via transformer T1', resistor R2' and capacitor C2') the necessary base drive for transistor $Q_D'$—thus turning on the power switch 206'. The photovoltaic array 950 will now supply charge to the series rechargeable batteries BA through BD based on the solar radiation received by the array 950.

When the solar radiation provided exceeds the desired charging of the batteries BA through BD, digital filter and trip out integrator 608' will experience accumulator overflow (as previously described above), causing the generation of TIMED TRIP to mode control 610', which in turn disables DRIVE so as to open the power switch 206', and additionally generates TRIPOUT to the one-shot multivibrator 954. Multivibrator 954 provides a logic one input to NO/NC of mode control 610', preventing enablement of DRIVE until such time as renewed charging of the batteries is to be allowed.

When the output of one-shot multivibrator 954 returns to logic zero, mode control 610' is initialized by RESET, the 5 millisecond timer 613 (FIG. 6A) begins to count, and DRIVE will be again enabled by mode control 610' in response to the next logic one received via input CNTRLP from threshold detector 952 and in response to the first DRCK2P signal received from timing circuitry 612'.

Thus, the monolithic solid state power controller of the invention can be employed in an A.C. system (as demonstrated with respect to FIG. 2 above), but can also—with minor changes in external connections to various components of the monolithic device Z5—also be employed in a D.C. system (as shown in FIG. 8). Moreover, the digital trip time computation performed by digital filter and trip out integrator 608' is especially advantageous in such a D.C. application, where, during peak solar radiation, the amount of charge applied to the sealed lead acid battery must be accurately controlled and regulated to assure long, reliable battery operation.

Numerous modifications and adaptations of the system of the invention will be apparent to those skilled in the art and thus it is intended by the appended claims to cover all such modifications and adaptations which fall within the true spirit and scope of the invention.

We claim:

1. A device for controlling the application of a source voltage to a load, resulting in the development of a load current which passes through a sense resistor to produce a sense voltage,
said device comprising:
detection means connected for detecting a zero voltage crossing in said source voltage and generating a corresponding zero voltage crossing output;
sensing means for receiving said sense voltage and responsive thereto for determining when said load current exceeds a first predetermined value, and generating a fast trip output corresponding thereto, said sensing means further deriving a digital output representing the magnitude of said load current;
computing means for comparing said digital output of said sensing means to a second predetermined value, less than said first predetermined value, for computing a trip time characteristic of said load current in accordance with the value and duration of said comparison, and for determining when said trip time is exceeded so as to generate a timed trip output; and
control means responsive to either of said fast trip output and said timed trip output for interrupting the application of said source voltage to said load, said control means being further responsive to said output of said detection means for preselected control mode synchronization therewith.

2. The device of claim 1, wherein said sensing means comprises:
comparator means for comparing said sense voltage to a reference voltage and selectively issuing a count up signal or a count down signal in accordance with said comparison;
up-down counter means for selectively counting up or counting down in response to said count up signal and said count down signal, respectively, to develop a count value representing said load current, said counter means generating said fast trip output when said counter means overflows and when said counter means underflows, respectively;
output means for reading out said count value of said counter means; and
logic means for operating on said read out count value to generate said signal output representing the magnitude of said load current.

3. The device of claim 2, wherein said output means comprises a parallel-to-serial converting register.

4. The device of claim 2, wherein said count value comprises binary bits including a sign bit and magnitude bits, said logic means comprising an exclusive-OR gate for performing an exclusive-OR operation between each magnitude bit and said sign bit.

5. The device of claim 2, wherein said up-down counter means comprises a binary counter having a binary count value, said sensing means further comprising means for converting said binary count value to analog form, whereby to derive said reference voltage for said comparator means.

6. The device of claim 1, wherein said digital output of said sensing means comprises a plurality of binary bits, said device further comprising means for generating bit timing signals for controlling said binary bits of said digital output of said sensing means, said computing means comprising an adder for selectively adding or subtracting to develop an adder output which defines said trip time characteristic of said load current, and a recirculating accumulator for receiving said adder output.

7. The device of claim 6, wherein said computing means further comprises means responsive to a first series of bit timing signals for comparing said digital output of said sensing means to a threshold value, and means responsive to a second series of bit timing signals for recirculating the contents of said recirculating accumulator when said digital output of said sensing means does not exceed said threshold value.

8. The device of claim 7, wherein said computing means further comprises means responsive to said first series of bit timing signals for comparing said digital output of said sensing means to said second predetermined value, and means responsive to said second series of bit timing signals for actuating said adder to selectively add said digital output of said sensing means to said accumulator when said digital output of said sensing means exceeds said second predetermined value, and to selectively subtract said digital output of said sensing means from said accumulator when said digital output of said sensing means is less than said second predetermined value.

9. The device of claim 6, wherein said computing means further comprises means responsive to a first series of bit timing signals for comparing said digital output of said sensing means to said second predetermined value, and means responsive to a second series of bit timing signals for actuating said adder to selectively add said digital output of said sensing means to said accumulator when said digital output of said sensing means exceeds said second predetermined value, and to selectively subtract said digital output of said sensing means from said accumulator when said digital output of said sensing means is less than said second predetermined value.

10. The device of claim 6, wherein said computing means further comprises a carry logic circuit operatively associated with said adder for selectively generating a carry signal during and in accordance with said selective adding or subtracting by said adder, and means responsive to a final bit timing signal of each said series of bit timing signals for detecting said carry signal from said carry logic circuit, and responsive thereto for generating said timed trip output of said computing means.

11. The device of claim 1, wherein said control means comprises:
   logic means for detecting said first trip output of said sensing means and said timed trip output of said computing means, and responsive to either of said fast trip output and said timed trip output for generating a tripout signal;
   switch means in series with said source voltage and said load for selectively providing said source voltage to said load or interrupting said source voltage; and
   drive means responsive to said tripout signal from said logic means for actuating said switch means so as to interrupt said source voltage applied to said load.

12. The device of claim 11, wherein said control means includes a control input for receiving an operator-initiated turn-on input, said control means including timer means for counting to a predetermined time, said control means being responsive to said turn-on input for actuating said timer means to count said predetermined time, said control means being responsive to said turn-on input when said predetermined time has elapsed for generating a drive-on signal, said drive means being responsive to said drive-on signal for actuating said switch means to provide said source voltage to said load.

13. The device of claim 1, wherein said control means includes a control input for receiving an operator-initiated turn-on input, and timer means for counting to a predetermined time, said control means further including switch means in series with said source voltage and said load for selectively providing said source voltage to said load or interrupting said source voltage, said control means being responsive to said turn-on input for actuating said timer means to count to said predetermined time, said control means being further responsive to said control input to issue a drive-on signal when said timer means has counted to said predetermined time, said switch means being responsive to said drive-on signal for providing said source voltage to said load.

14. The device of claim 13, wherein said control means issues said drive-on signal in synchronization with detection of said zero crossing in said source voltage by said zero voltage detector means.

15. The device of claim 1, wherein said control means includes a control input for receiving an operator-initiated turn-off signal, and timer means for counting to a predetermined time, said device including switch means in series with said source voltage and said load for selectively providing said source voltage to said load or interrupting said source voltage, said control means being responsive to said turn-off input for actuating said timer means to count to said predetermined time, said control means being further responsive to said turn-off input for issuing a disabling output when said timer means has counted to said predetermined time, said switch means being responsive to said disabling output for interrupting said source voltage applied to said load.

16. The device of claim 15, wherein said control means issues said disabling signal in synchronization with detection of said zero crossing in said load current by said zero crossing detecting means.

17. The device of claim 1, wherein at least said control means is implemented in a monolithic device, and wherein said load current passes through a reference resistor to produce a reference voltage, said monolithic device having a reference terminal connected to said reference voltage and a control terminal for receiving operator-initiated turn-on and turn-off inputs, said device including switch means connected in series between said source voltage and said load for selectively providing said source voltage to said load or interrupting said source voltage, said switch means being operable in the normally open mode of operation when said control terminal and said reference terminal of said monolithic device are unconnected, said switch means being operable in a normally closed mode of operation when said control terminal is connected to said reference terminal.

18. The device of claim 1, wherein said device further comprises interface means responsive to interruption of the application of said source voltage to said load by said control means for generating a tripout indicator.

19. The device of claim 1, wherein said control means comprises status logic means responsive to the sense voltage for providing a status output indicating whether or not said source voltage is being applied to said load, said device further comprising interface means responsive to said status output for issuing a status indicator.

20. The device of claim 1, wherein said device comprises interface means for receiving operator-initiated control signals, said control signals comprising at least a turn-on signal, said control means being responsive to said turn-on signal for enabling the application of said source voltage to said load a predetermined time after receipt of the turn-on signal.

21. The device of claim 1, wherein said device comprises interface means for receiving operator-initiated control signals, said control signals including at least a turn-off signal, said control means being responsive to said turn-off signal for interrupting the application of said source voltage to said load a predetermined time after receipt of said turn-off signal.

22. A method for controlling the application of a source voltage to a load, resulting in the development of a load current which passes through a sense resistor to produce a sense voltage, said method comprising the steps of:
   (a) monitoring the load current to determine if said load current exceeds a first predetermined value;
   (b) generating a fast trip output when said load current exceeds said predetermined value;
   (c) monitoring said load current to determine if said load current is greater or lesser than a second predetermined value;

(d) additively accumulating the value of said load current if said load current is determined to be greater than said second predetermined value;

(e) subtractively accumulating the value of said load current if said load current is determined to be less than said second predetermined value; and (f) generating a timed trip output when the accumulated value of said load current from said steps (d) and (e) exceeds a predetermined threshold.

23. A device for controlling the application of a source voltage to a load, resulting in the development of a load current which passes through a sense resistor to produce a sense voltage, said device comprising:

sensing means for receiving said sense voltage and responsive thereto for determining when said load current exceeds a first predetermined value, and generating a fast trip output corresponding thereto, said sensing means further deriving a digital output representing the magnitude of said load current;

computing means for comparing said digital output of said sensing means to a second predetermined value, less than said first predetermined value, for computing a trip time characteristic of said load current in accordance with an overload value and duration of said comparison, and for determining when said trip time is exceeded so as to generate a timed trip output; and control means responsive to either of said first trip output and said timed trip output for interrupting the application of said source voltage to said load.

24. The device of claim 23, wherein said sensing means comprises:

comparator means for comparing said sense voltage to a reference voltage and selectively issuing a count up signal or a count down signal in accordance with said comparison;

up-down counter means for selectively counting up or counting down in response to said count up signal and said count down signal, respectively, to develop a count value representing said load current, said counter means generating said fast trip output when said counter means overflows and when said counter means underflows, respectively;

output means for reading out said count value of said counter means; and logic means for operating on said read out count value to generate said digital output representing the magnitude of said load current.

25. The device of claim 24, wherein said output means comprises a parallel-to-serial converting register.

26. The device of claim 24, wherein said count value comprises binary bits including a sign bit and magnitude bits, said logic means comprising an exclusive-OR gate for performing an exclusive-OR operation between each magnitude bit and said sign bit.

27. The device of claim 23, wherein said control means comprises:

logic means for detecting said fast trip output of said sensing means and said timed trip output of said computing means, and responsive to either of said fast trip output and said timed trip output for generating a tripout signal;

switch means in series with said source voltage and said load for selectively providing said source voltage to said load or interrupting said source voltage; and drive means responsive to said tripout signal from said logic means for actuating said switch means so as to interrupt said source voltage applied to said load.

28. A device for controlling the application of a source voltage to a load, resulting in the development of a load current which passes through a sense resistor to produce a sense voltage, said device comprising:

sensing means for receiving said sense voltage and responsive thereto for determining when said load current exceeds a first predetermined value, and generating a fast trip output corresponding thereto, said sensing means further deriving a digital output representing the magnitude of said load current;

computing means for comparing said digital output of said sensing means to a second predetermined value, less than said first predetermined value, for computing a trip time characteristic of said load current in accordance with said comparison, and for determining when said trip time is exceeded so as to generate a timed trip output; and control means responsive to either of said fast trip output and said timed trip output for interrupting the application of said source voltage to said load; and wherein said digital output of said sensing means comprises a plurality of binary bits, said device further comprising means for generating bit timing signals for controlling said binary bits of said digital output of said sensing means, said computing means comprising an adder for selectively adding or subtracting to develop an adder output which defines said trip time characteristic of said load current, and a recirculating accumulator for receiving said adder output.

29. The device of claim 28, wherein said computing means further comprises means responsive to a first series of bit timing signals for comparing said digital output of said sensing means to a threshold value, and means responsive to a second series of bit timing signals for recirculating the contents of said recirculating accumulator when said digital output of said sensing means does not exceed said threshold value.

30. The device of claim 29, wherein said computing means further comprises means responsive to said first series of bit timing signals for comparing said digital output of said sensing means to said second predetermined value, and means responsive to said second series of bit timing signals for actuating said adder to selectively add said digital output of said sensing means to said accumulator when said digital output of said sensing means exceeds said second predetermined value, and to selectively subtract said digital output of said sensing means from said accumulator when said digital output of said sensing means is less than said second predetermined value.

31. The device of claim 28, wherein said computing means further comprises means responsive to a first series of bit timing signals for comparing said digital output of said sensing means to said second predetermined value, and means responsive to a second series of bit timing signals for actuating said adder to selectively add said digital output of said sensing means to said accumulator when said digital output of said sensing means exceeds said second predetermined value, and to selectively subtract said digital output of said sensing means from said accumulator when said digital output of said sensing means is less than said second predetermined value.

32. The device of claim 28, wherein said computing means further comprises a carry logic circuit operatively associated with said adder for selectively generating a carry signal during and in accordance with said selective adding or subtracting by said adder, and means responsive to a final bit timing signal of each said series of bit timing signals for detecting said carry signal from said carry logic circuit, and responsive thereto for generating said timed trip output of said computing means.

33. A device for controlling the application of a source voltage to a load, resulting in the development of a load current which passes through a sense resistor to produce a sense voltage, said device comprising:

sensing means for receiving said sense voltage and responsive thereto for determining when said load current exceeds a first predetermined value, and generating a fast trip output corresponding thereto, said sensing means further deriving a digital output representing the magnitude of said load current;

computing means for comparing said digital output of said sensing means to a second predetermined value, less than said first predetermined value, for computing a trip time characteristic of said load current in accordance with said comparison, and for determining when said trip time is exceeded so as to generate a timed trip output;

control means responsive to either of said fast trip output and said timed trip output for interrupting the application of said source voltage to said load;

wherein said control means comprises:

logic means for detecting said fast trip output of said sensing means and said timed trip output of said computing means, and responsive to either of said fast trip output and said timed trip output for generating a tripout signal;

switch means in series with said source voltage and said load for selectively providing said source voltage to said load or interrupting said source voltage; and drive means responsive to said tripout signal from said logic means for actuating said switch means so as to interrupt said source voltage applied to said load; and wherein said control means includes a control input for receiving an operator-initiated turn-on input, said control means including timer means for counting to a predetermined time, said control means being responsive to said turn-on input for actuating said timer means to count to said predetermined time, said control means being responsive to said turn-on input when said predetermined time has elapsed for generating a drive-on signal, said drive means being responsive to said drive-on signal for actuating said switch means to provide said source voltage to said load.

34. A device for controlling the application of a source voltage to a load, resulting in the development of a load current which passes through a sense resistor to produce a sense voltage, said device comprising:

sensing means for receiving said sense voltage and responsive thereto for determining when said load current exceeds a first predetermined value, and generating a fast trip output corresponding thereto, said sensing means further deriving a digital output representing the magnitude of said load current;

computing means for comparing said digital output of said sensing means to a second predetermined value, less than said first predetermined value, for computing a trip time characteristic of said load current in accordance with said comparison, and for determining when said trip time is exceeded so as to generate a timed trip output;

control means responsive to either of said fast trip output and said timed trip output for interrupting the application of said source voltage to said load; and wherein said control means includes a control input for receiving an operator-initiated turn-on input, and timer means for counting to a predetermined time, said control means further including switch means in series with said source voltage and said load for selectively providing said source voltage to said load or interrupting said source voltage, said control means being responsive to said turn-on input for actuating said timer means to count to said predetermined time, said control means being further responsive to said control input to issue a drive-on signal when said timer means has counted to said predetermined time, said switching means being responsive to said drive-on signal for providing said source voltage to said load.

* * * * *

UNITED STATES PATENT AND TRADEMARK OFFICE
CERTIFICATE OF CORRECTION

PATENT NO. : 4,174,496
DATED : November 13, 1979
INVENTOR(S) : William A. McFall et al It is certified that error appears in the above-identified patent and that said Letters Patent are hereby corrected as shown below:

Column 28, line 20, delete [signal] and insert ---digital---.

Column 29, line 22, delete [first] and insert ---fast---.

Signed and Sealed this

Fourth Day of March 1980

[SEAL]

*Attest:*

*Attesting Officer*

SIDNEY A. DIAMOND

*Commissioner of Patents and Trademarks*